(12) United States Patent
Teitel

(10) Patent No.: US 9,975,594 B2
(45) Date of Patent: May 22, 2018

(54) LIGHT WITH INCREASED VISIBILITY AND FLEXIBLE MOUNTING SYSTEM

(71) Applicant: PEDAL BRITE LLC, Scottsdale, AZ (US)

(72) Inventor: Lynn Teitel, Scottsdale, AZ (US)

(73) Assignee: Pedal Brite LLC, Scottsdale, AZ (US)

( * ) Notice: Subject to any disclaimer, the term of this patent is extended or adjusted under 35 U.S.C. 154(b) by 0 days. days.

(21) Appl. No.: 15/431,055

(22) Filed: Feb. 13, 2017

(65) Prior Publication Data
US 2017/0151990 A1    Jun. 1, 2017

Related U.S. Application Data

(63) Continuation of application No. 15/200,312, filed on Jul. 1, 2016, now Pat. No. 9,573,644, which is a continuation-in-part of application No. 13/797,841, filed on Mar. 12, 2013, now Pat. No. 9,388,968.

(51) Int. Cl.
| | |
|---|---|
| *F21S 8/00* | (2006.01) |
| *F21V 17/00* | (2006.01) |
| *B62J 6/02* | (2006.01) |
| *B62J 6/04* | (2006.01) |
| *F21V 21/08* | (2006.01) |
| *F21S 9/02* | (2006.01) |
| *F21V 15/01* | (2006.01) |
| *F21W 121/00* | (2006.01) |

(52) U.S. Cl.
CPC . *B62J 6/02* (2013.01); *B62J 6/04* (2013.01); *F21S 9/02* (2013.01); *F21V 15/01* (2013.01); *F21V 17/00* (2013.01); *F21V 21/08* (2013.01); *F21W 2121/00* (2013.01)

(58) Field of Classification Search
CPC ... F21V 17/00; F21V 19/00; B62J 6/02; B62J 26/00; Y10T 29/49826
See application file for complete search history.

(56) References Cited

U.S. PATENT DOCUMENTS

| | | | | |
|---|---|---|---|---|
| 6,109,770 A | * | 8/2000 | Choimet | B62J 6/001 |
| | | | | 340/427 |
| 6,446,922 B2 | * | 9/2002 | Irie | B62J 99/00 |
| | | | | 248/214 |
| 7,950,835 B2 | * | 5/2011 | Carillo | B62J 6/00 |
| | | | | 280/288.4 |

(Continued)

*Primary Examiner* — Tracie Y Green
(74) *Attorney, Agent, or Firm* — Brian M. Kaufman; Robert D. Atkins; Patent Law Group: Atkins and Associates, P.C.

(57) ABSTRACT

A light device includes a light engine. A plurality of petals extends radially outward from the light engine. A trim is disposed over the petals and light engine. An installation card is disposed between the trim and the petals and includes an elongated opening. A strap extends through the elongated opening of the installation card. A light-emitting diode is connected to the light engine. A support component is formed on a surface of the petals. The strap includes a hook surface and a loop surface opposite the hook surface. The installation card includes a second elongated opening formed near an edge of the installation card and a third opening formed in a central region of the installation card. A plurality of straps includes a width of the straps being less than a width of the elongated opening. The plurality of straps includes a zip tie.

20 Claims, 21 Drawing Sheets

(56) References Cited

U.S. PATENT DOCUMENTS

| | | | |
|---|---|---|---|
| 9,388,968 B2* | 7/2016 | Teitel | F21V 17/00 |
| 9,573,644 B2* | 2/2017 | Teitel | A41G 1/005 |
| 2007/0070639 A1* | 3/2007 | Tiesler | B60Q 3/44 |
| | | | 362/488 |
| 2007/0291488 A1 | 12/2007 | Heathcock | |
| 2008/0123353 A1 | 5/2008 | Liu | |
| 2010/0127030 A1* | 5/2010 | Muhlberger | B62J 9/003 |
| | | | 224/420 |
| 2012/0275142 A1* | 11/2012 | Lundy | F21L 4/027 |
| | | | 362/184 |

\* cited by examiner

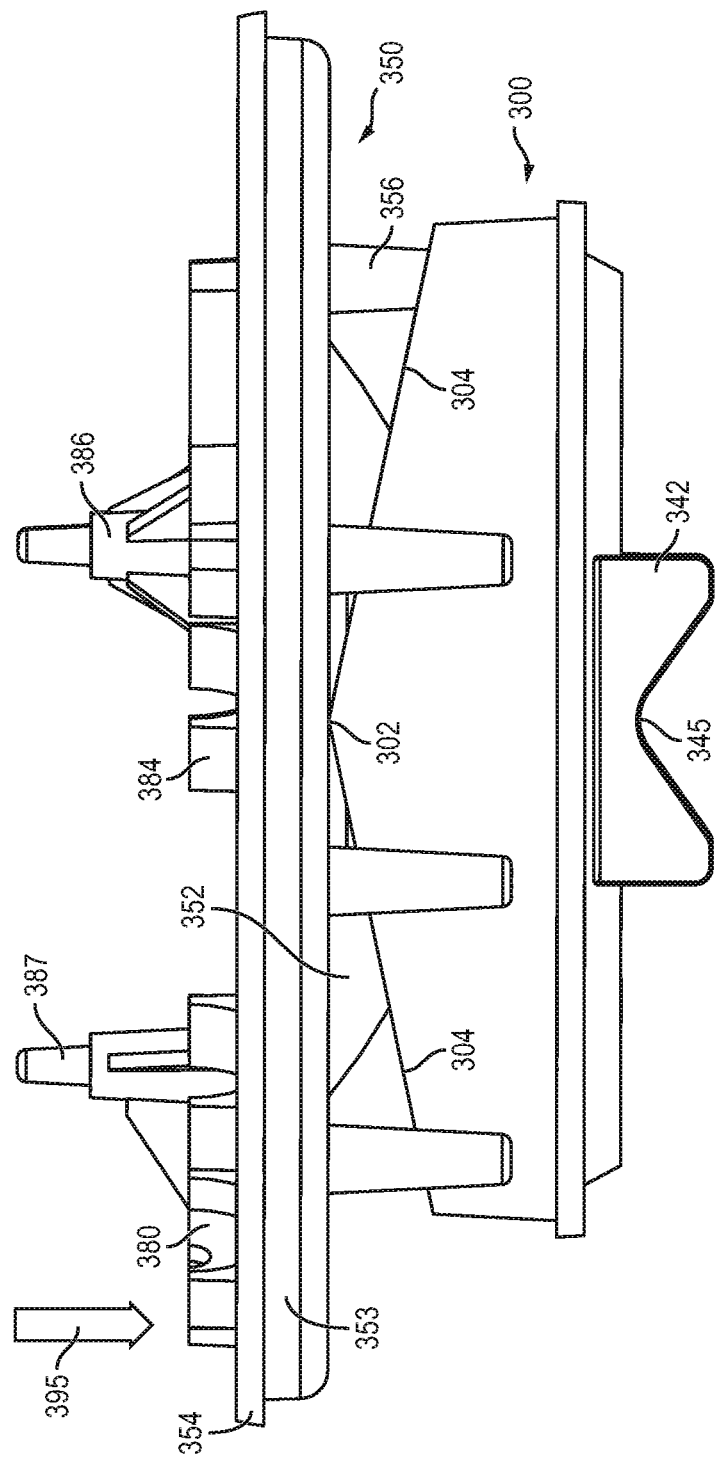

LIGHT WITH INCREASED VISIBILITY AND FLEXIBLE MOUNTING SYSTEM

CLAIM OF DOMESTIC PRIORITY

The present application is a continuation of U.S. patent application Ser. No. 15/200,312, now U.S. Pat. No. 9,573,644, filed Jul. 1, 2016, which is a continuation-in-part of U.S. patent application Ser. No. 13/797,841, now U.S. Pat. No. 9,388,968, filed Mar. 12, 2013, which applications are incorporated herein by reference.

FIELD OF INVENTION

The disclosure relates generally to lighting products, and, specifically, to a light with increased visibility and a flexible mounting system.

BACKGROUND OF THE INVENTION

People use bicycles as an inexpensive means of transportation. Bicycles enable a person to get from point A to point B under the power of the bicycle rider. Bicycles also provide a source of exercise and entertainment. Cyclists face safety issues whether riding for transportation, fun, or exercise. Riders are exposed on bicycles and usually ejected from the bicycle in an accident, leaving the cyclist vulnerable to resulting injuries. The only guaranteed way a cyclist can avoid injury resulting from an accident is to avoid accidents altogether. Visibility is critical to avoiding accidents. People riding bicycles need to be able to see to ride safely and avoid objects in the path of the bicycle. Bicycle riders also need to be seen by other cyclists, pedestrians, and drivers so that other people can avoid hitting the riders.

As the sun sets, visibility declines for cyclists, pedestrians, and drivers alike, increasing the chance that an obstacle or cyclist might go unseen. Lighting plays a critical role in bicycle safety after dusk. Cyclists, pedestrians, and drivers need assistance to see obstacles and other travelers on the road at night. Cyclists and pedestrians, in particular, need to be seen by drivers to prevent dangerous circumstances leading to accident and injury.

Many cyclists and pedestrians refuse to use existing lights. Some people see a bicycle as a form of expression and refuse to use ugly or boring lights for aesthetic reasons. Others refuse to use lights due to the expense and hassle of installation and removal of the bicycle light. Nobody wants to spend 10 minutes mounting a light for a 5 minute ride. These barriers preventing people from using lights on a bicycle impede the safe use of a bicycle for transportation and enjoyment by limiting the use of lights. A need exists for a bicycle light with improved ease of installation, flexibility of use, and aesthetics to increase light use by cyclists and improve bicycle safety.

Even when riders do use bicycle lights, existing lights for cyclists and pedestrians provide only a small lighted area for automobile drivers to see, usually just the size of the light bulb or light engine used. The lights provide minimal visibility of cyclists to automobile drivers. The less visible a cyclist is to an automobile driver, the less likely a driver is to discern a pedestrian or cyclist when approaching in the dark. A need exists for a light that improves visibility of cyclists and pedestrians to nearby automobile drivers.

BRIEF DESCRIPTION OF THE DRAWINGS

FIGS. 13a-13c illustrate rotating the battery housing relative to the base to adjust the angle of the second light device embodiment;

DETAILED DESCRIPTION OF THE DRAWINGS

Aspects of one or more example embodiments are described in the following disclosure with reference to the Figures, in which like numerals represent the same or similar elements. While the described example embodiments include the best mode, it will be appreciated by those skilled in the art that it is intended to cover alternatives, modifications, and equivalents as may be included within the spirit and scope of the invention as set forth and defined by the appended claims and their equivalents as supported by the following disclosure and drawings.

Figure 1:
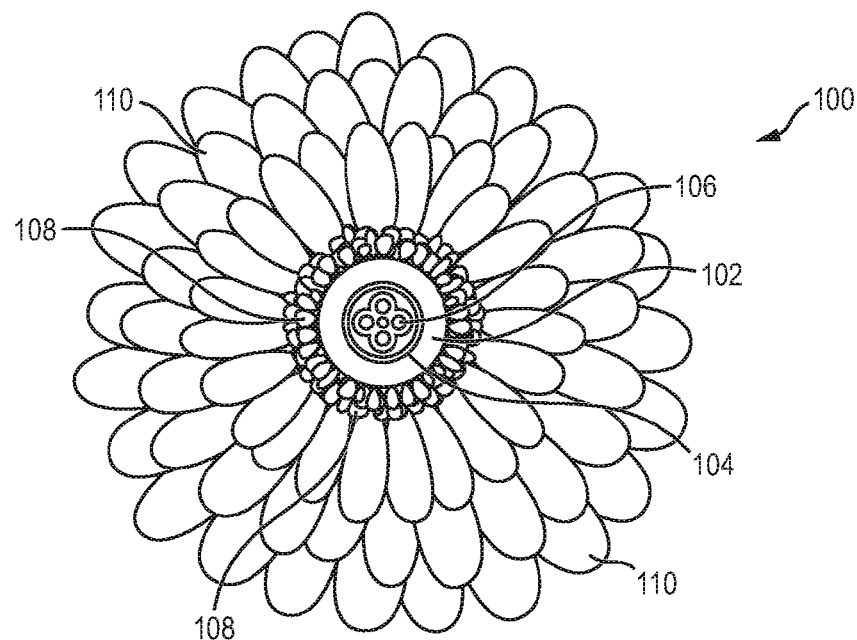
FIG. 1 illustrates a front side of a lighting device having increased visibility and improved ease of installation.

FIG. 1 illustrates a plan view of personal lighting device 100 in the shape of a flower. Lighting device 100 includes a light engine 102 in a central location of lighting device 100. Light engine 102 is round in shape, but other shapes such as triangular, square, elliptical, or polygonal are envisioned. Light engine 102 has a plastic casing but could also be metal, rubber, or other moldable material to provide support and protect light engine 102. The top surface of light engine 102 is covered by lens 104 in the center of light engine 102. Lens 104 is a translucent or transparent material shaped to optically focus or disperse light from light engine 102. Lens 104 is disposed over light-emitting diodes (LEDs) 106 of light engine 102. Light engine 102 emits light and can be configured to use various colors, with white and red light being common when mounting the lighting device to the front or rear of a bicycle. Additional colors and combinations may be used to increase visibility or alter aesthetics of light device 100. Light engine 102 may provide flashing, intermittent, or constant light, depending on the selected light setting.

Light engine 102 is mounted in the center of stamens 108 and petals 110 of lighting device 100 so that stamens 108 and petals 110 surround a peripheral region of light engine 102. Light engine 102 occupies the central position where a pistil would be located in a flower. Alternatively, light engine 102 can emit light from LEDs disposed on the ends of stamens 108 or in between petals 110 to provide increased visibility. Petals 110 and stamens 108 can be made of cloth, rubber, plastic, metal, or any other material that provides structure for the trim and can be illuminated by light engine 102. Stamens 108 and petals 110 extend radially outward from light engine 102 to form a circular shape. Petals can range in number and orientation from a single, continuous petal 110 that surrounds or partially surrounds light engine 102 to multiple petals 110 that surround or partially surround light engine 102. Petals 110 and stamens 108 provide additional surface area for illumination by and reflection of light generated by light engine 102 to increase visibility of lighting device 100 by providing a large, lighted surface area on lighting device 100. A continuous, solid trim can also surround light engine 102 using a single petal to provide additional surface area for illumination. In one embodiment, petals 110 or stamens 108 are made from a reflective material so that light from sources other than light engine 102 is reflected to increase visibility of lighting device 100.

Light engine 102 is illustrated in FIG. 1 as having an LED light source. Other light sources can be used in place of LEDs 106 including florescent, halogen, or filament light bulbs. Light engine 102 can include a single light source, or multiple light sources such as the four LEDs shown in FIG. 1. LEDs 106 emit light that shines through lens 104 and illuminates the surroundings, such as a road or sidewalk around a bicycle, to increase visibility of obstacles and hazards for the user. LEDs 106 also illuminate petals 110 or stamens 108 and provide a lit surface to increase visibility of the lighting device to other cyclists and drivers.

Figure 2:
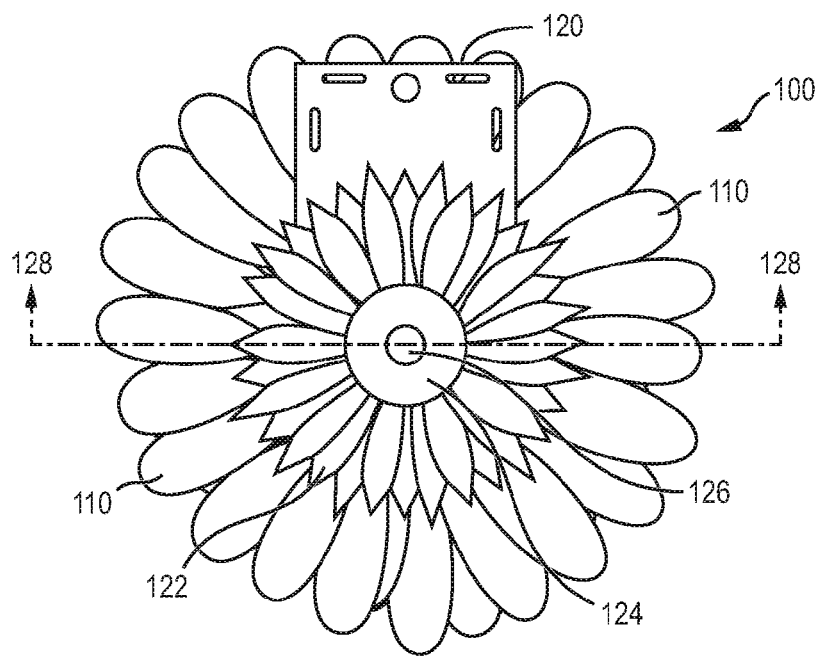
FIG. 2 illustrates a back side of a lighting device having increased visibility and improved ease of installation.

FIG. 2 illustrates the rear of lighting device 100. Personal lighting device 100 includes installation card 120 mounted between trim 122 and petals 110 to provide a mounting surface for personal lighting device 100. The exterior portion of trim 122 is shaped like the leaves beneath a flower, or a sepal. Alternatively, trim 122 can include a flat surface to provide an improved mounting surface. In one embodiment, installation card 120 is used instead of trim 122, or the two are integrated into one piece. Installation card 120 is made of plastic, rubber, metal, or other materials to provide structural support for openings resulting in ease of installation. Trim 122 includes surface 124 formed in a bell shape. Trim 122 and surface 124 are made from plastic, rubber, metal, or other moldable materials. Surface 124 has a flat central area to provide a mating surface for cap 126. Cap 126 is a nut with threading on the inside surface to accept a screw and fasten the components of lighting device 100 together. Cap 126 is made of metal or a similarly rigid material to provide strength when holding a screw and to press against trim 122. Cap 126 can be plastic or metallic and holds a screw passing through the center of lighting device 100.

Figure 3:
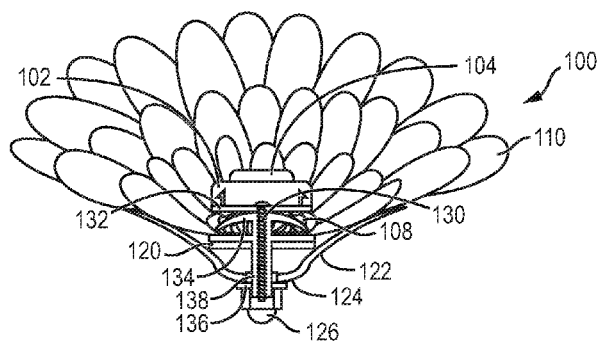
FIG. 3 illustrates a cross section of a lighting device having improved visibility and ease of installation.

FIG. 3 illustrates a cross section of lighting device 100 along line 128. Cap or nut 126 receives screw 130 to fasten components of lighting device 100 together. Screw 130 is inserted through base 132 of light engine 102 with the head of screw 130 pressing against base 132. Light engine 102 is affixed to base 132 using tabs of base 132 inserted into slots in light engine 102 designed to mate with tabs. After tabs of base 132 are inserted into light engine 102, light engine 102 is twisted relative to base 132 to lock light engine 102 in place relative to base 132. Screw 130 extends through base 132, flange 134, installation card 120, trim 122, washer 136, tube 138, and into cap 126 pressing adjacent components together. Screw 130 is twisted into cap 126 to secure components between cap 126 and head of screw 130. Base 132 is pressed into flange 134 by screw 130 and can also be attached to flange 134 by an adhesive, as can any adjacent components of lighting device 100. Flange 134 extends downward with a stem portion or tube 138 extending away from flange 134 opposite base 132 and provides a path for screw 130 to extend to cap 126.

Figure 4:
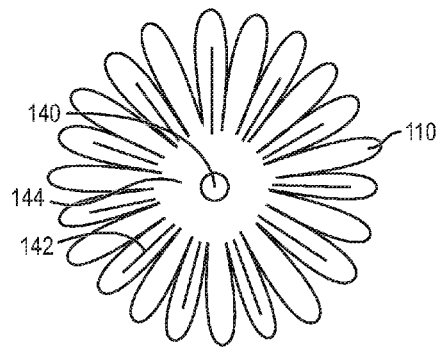
FIG. 4 illustrates petals of a lighting device cut from a piece of cloth.

FIG. 4 illustrates petals 110 cut from a piece of cloth with opening 140 and support component 142 formed along a back surface of petal 110. Multiple petals 110 or stamens 108 can be cut from a single piece of cloth with an open center 140 so that petals 110 are connected. For example, petals 110 are cut from a piece of cloth with petals 110 meeting at a base portion 144 of the cloth to form a ring with an opening 140 at the center. The open center of the ring allows light engine 102, tube 138, screw 130, or other components of lighting device 100 to pass through opening 140 of petals 110. Stamens 108 cover the base portion of the ring of petals 110 once installed in lighting device 100 so that each petal 110 appears to be an individual petal, as shown in FIGS. 1 and 3.

Figure 5:
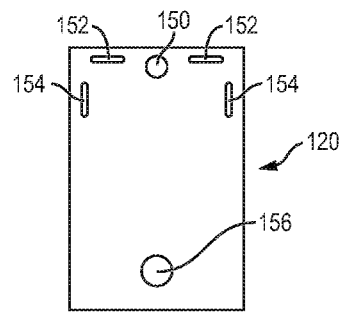
FIG. 5 illustrates an installation card used to mount a lighting device with improved ease of installation.

FIG. 5 illustrates installation card 120 in greater detail. In one embodiment, installation card 120 has a width of 7.6 centimeters (cm) or 3 inches, a height of 10.8 cm or 4.25 inches, and a thickness of approximately 1 millimeter (mm). Openings 150, 152, 154, and 156 are formed through card 120. Opening 150 is shown as being round with a diameter of approximately 7 mm with various opening sizes possible. Opening 150 formed in a central region of installation card 120 allows a mounting device, such as a nail, screw, hook, strap, zip tie, or string, to pass through and fix installation card 120 to another object. Opening 152 has an elongated shape parallel to the shorter edge of installation card 120, with a height of approximately 3 mm and a flat segment with a length of approximately 13 mm. The rounded portion of opening 152 on either end of the flat segment is circular with a diameter equal to the height of the adjacent flat segment. The elongated shape of opening 152 is configured to allow a fixing mechanism such as a string, strap, or zip tie to fit through opening 152 and maintain a stable fit.

Opening 154 has an elongated shape, with the elongated side being parallel to the longer edge of installation card 120. Opening 154 has a height of approximately 3 mm while the elongated, flat segment has a length of approximately 13 mm. The rounded portion of opening 154 on either end of the flat segment is circular with a diameter equal to the height of the adjacent flat segment. The elongated shape of opening 154 is configured to allow a fixing mechanism such as a string, strap, or zip tie to fit through opening 154 and maintain a stable fit. Opening 156 is shown as being round with a diameter of approximately 13 mm with various opening sizes possible. Opening 156 allows tube 138 and screw 130 to pass through opening 156 and fix installation card 120 to lighting device 100. Installation card 120 provides multiple mounting options to increase ease of installation of lighting device 100.

Figure 6A:
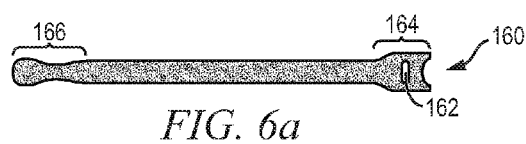
FIGS. 6a-6c illustrate a strap for use with the installation card used to mount a lighting device with improved ease of installation.

FIG. 6a illustrates strap 160 for fastening lighting device 100 to a bicycle or other object using installation card 120. Strap 160 has a width less than the length of openings 152 or 154 so that strap 160 can pass through opening 152 and 154. Strap 160 is approximately 20 cm long and 1.3 cm wide, corresponding to the 1.3 cm length of the flat segment of openings 152 and 154. Strap 160 has opening 162 formed in tail portion 164. Tail portion 164 is approximately 2 cm wide at the widest point. Opening 162 of tail portion 164 is approximately 1.3 cm long and 3 mm wide to allow head portion 166 to pass through opening 162. Head portion 166 is approximately 10 mm across the widest point and 7 mm across at the narrowest point.

Figure 6B:
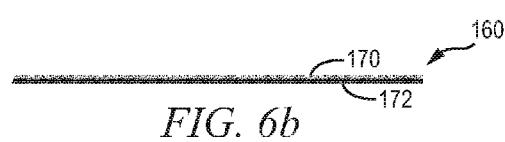

In FIG. 6a, Strap 160 uses a hook and loop fastener such as Velcro® to form a loop for ease of installation and removal of lighting device 100. Other fasteners could also function equally well, such as snaps, belt-style hook and holes, zip ties, string, rope, or button closures, for example. FIG. 6b shows a side view of strap 160. Upper surface 170 includes cloth loops over the length of strap 160. The cloth loops are configured to receive hooks from lower surface 172. When hooks from lower surface 172 are pressed against the cloth loops of surface 170, the two sides provide adhesion to hold surfaces 170 and 172 of strap 160 together.

Figure 6C:
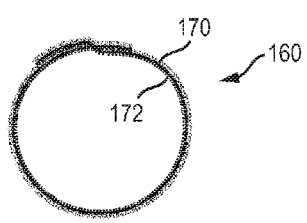

FIG. 6c shows strap 160 bent into a circle with surface 170 facing outward and surface 172 facing inward. The strap also works if the surfaces are reversed with surface 170 facing inward and surface 172 facing outward. Head portion 166 is inserted through slot or opening 162 of tail portion 164 from FIG. 6a. The desired length of strap 160 is pulled through opening 162 of tail portion 164 to adjust the diameter of the circular shape formed by strap 160. As more length of strap 160 is pulled through opening 162, the diameter of the circle gets smaller. Surface 172 of head portion 166 and the length of strap 160 pulled through opening 162 is pressed against surface 170 of strap 160 adjacent to opening 162 and extending away from tail portion 164. Surface 170 of strap 160 presses against surface 172 of tail portion 164 between opening 162 and the tip of tail portion 164. The contact between surfaces 170 and 172 provides adhesion for fast and easy installation and removal of installation card 120 and lighting device 100.

Figure 7A:
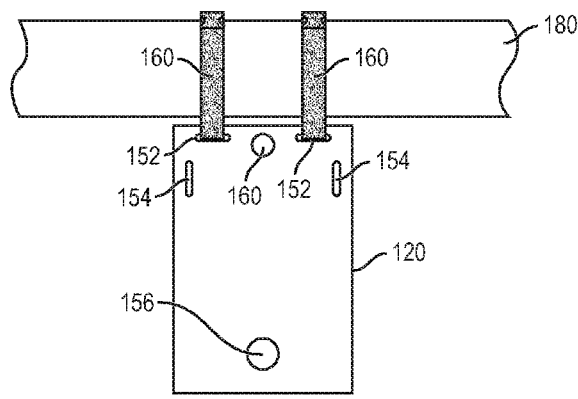
FIGS. 7a-7c illustrate an installation card attached to a horizontal bar using straps to mount a lighting device.

In FIG. 7a, installation card 120 is mounted to bar 180 using straps 160. Straps 160 pass through opening 152 at the top of card 120 and around horizontal bar 180. Strap 160 has head portion 166 pulled through opening 162 of tail portion 164 until strap 160 is relatively snug around bar 180. Installation card 120 hangs below bar 180 with openings 154 and 150 unoccupied. Lighting device 100 is omitted from FIG. 7a to illustrate the configuration of card 120. The round shape of opening 156 allows tube 138 and screw 130 to pass through opening 156 for attaching installation card 120 to lighting device 100. Installation card 120 provides multiple mounting options to increase ease of installation and removal of lighting device 100.

Figure 7B:
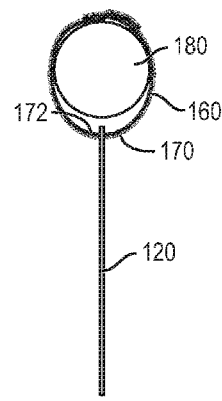

FIG. 7b shows a cross section of installation card 120 and bar 180. Bar 180 is depicted as round, although straps 160 attach to any shape of bar given the flexibility of strap 160. Strap 160 passes through installation card 120 at opening 152 and follows a contour of bar 180 to form a closed loop around the bar. Strap 160 has head portion 166 pulled through opening 162 of tail portion 164 until strap 160 is relatively snug around bar 180. Surfaces 172 and 170 are pressed together to provide adhesion and maintain the loop formed by strap 160 around bar 180. Other types of straps can be used in place of hook and loop strap 160, such as straps using snaps, belt-style hook and holes, zip ties, string, rope, or button closures, for example. Installation card 120 hangs below bar 180 with openings 154 and 150 unoccupied. Card 120 supports lighting device 100 and provides multiple mounting options to increase ease of installation and removal of lighting device 100.

Figure 7C:
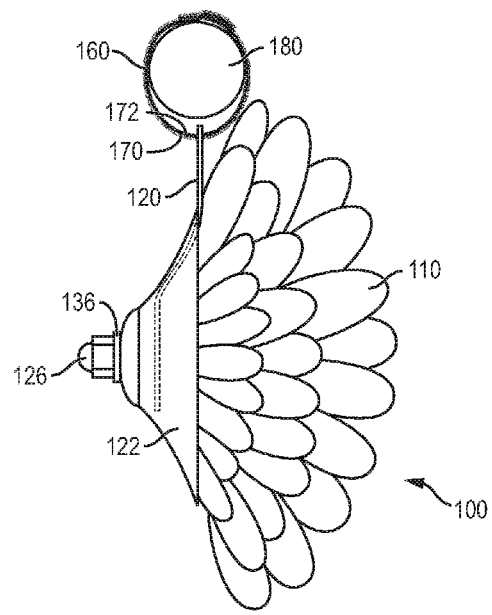

FIG. 7c illustrates lighting device 100 mounted to horizontal bar 180 using installation card 120. Strap 160 passes through installation card 120 and follows a contour of bar 180 to form a closed loop. Installation card 120 is integrated into lighting device 100 and pressed between petals 110 and trim 122. Card 120 has petals 110, stamens 108, light engine 102, and the head of screw 130 on one side of the card while trim 122, washer 136, and cap 126 are on the opposite side of the card. Tube 138 and screw 130 pass through opening 156 of card 120 and hold card 120 in place on light device 100. Installation card 120 provides a fast and easy method of installing lighting device 100 on horizontal bar 180. In one embodiment, horizontal bar 180 is part of a handlebar of a bicycle.

Figure 8A:
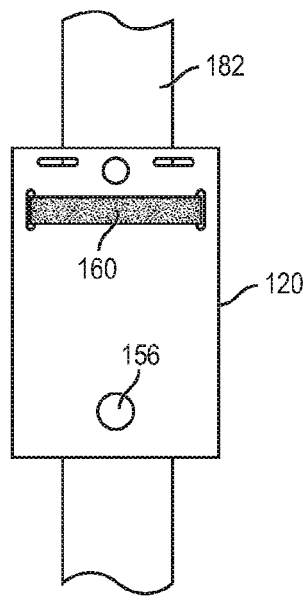
FIGS. 8a-8c illustrate an installation card attached to a vertical bar using straps to mount a lighting device.
Figure 8B:
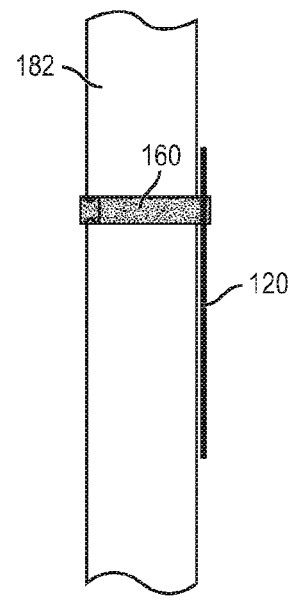
Figure 8C:
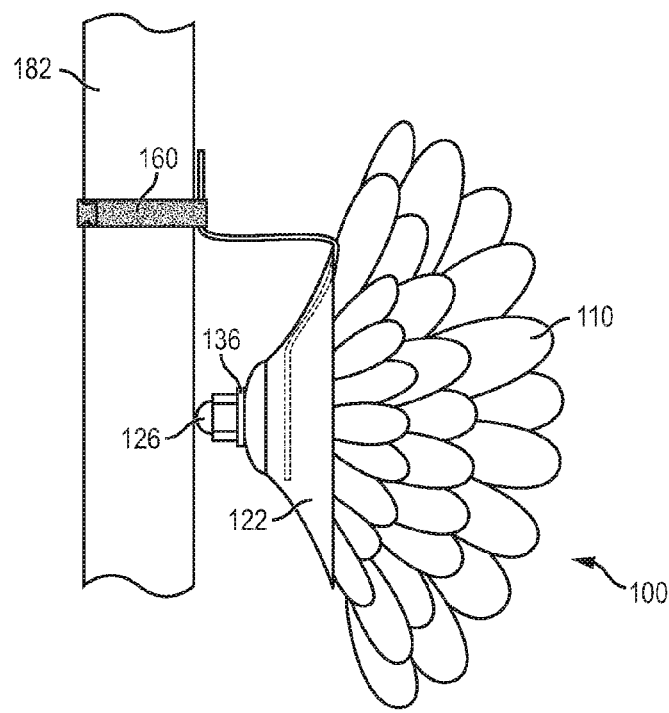

FIGS. 8a-8c show installation card 120 attached to a vertical bar 182 to mount lighting device 100. In FIG. 8a, strap 160 passes through openings 154 along the side edges of installation card 120 and around vertical bar 182. Strap 160 has head portion 166 pulled through opening 162 of tail portion 164 until strap 160 is snug around bar 180. Strap 160 is pulled tight to provide enough support to prevent installation card 120 from sliding down bar 182. Other types of straps 160 can be used in place of the hook and loop strap, such as straps using snaps, belt-style hook and holes, zip ties, string, rope, or button closures, for example. FIG. 8b illustrates installation card 120 attached to vertical bar 182 without lighting device 100. Installation card is parallel to bar 182 when no pressure is applied to bend installation card 120. In one embodiment, lighting device 100 has little depth behind installation card 120 so that installation card 120 can remain substantially parallel to bar 182 while lighting device 100 is mounted.

FIG. 8c illustrates installation card 120 attaching lighting device 100 to vertical bar 182. Installation card 120 is flexible so that the portion of card 120 with opening 156 can move away from bar 182 while strap 160 holds the portion of card 120 near openings 154 close to or against bar 182. When lighting device 100 is mounted to vertical bar 182 using installation card 120, the flexibility of card 120 increases the pressure exerted by strap 160 against bar 182 and increases tension in strap 160. Trim 122 extends between installation card 120 and bar 182, bending installation card 120 away from bar 182 to create space for lighting device 100. Lighting device 100 is mounted by card 120. The round shape of opening 156 allows tube 138 and screw 130 to pass through opening 156 and fix installation card 120 to lighting device 100. Installation card 120 can be bent to varying degrees to mount lighting device 100 so that light engine 102 is at various angles to bar 182. Installation card 120 provides multiple mounting options to increase ease of installation and removal of lighting device 100.

Figure 9A:
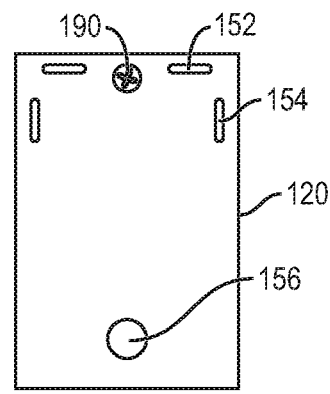
FIGS. 9a-9c illustrate the installation card mounted to a flat surface using a screw or hook to mount a lighting device.
Figure 9B:
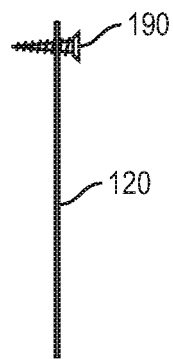
Figure 9C:
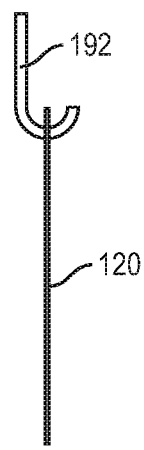

FIGS. 9a-9c illustrate alternative methods of mounting installation card 120 and lighting device 100. Card 120 includes opening 150 in a central area of the top side of card 120, between openings 152. Opening 150 has a round shape, although other opening shapes are also effective. Opening 150 provides space to fix card 120 to a surface. In FIGS. 9a and 9b, screw 190 is inserted through opening 150 and screwed into a mounting surface, such as bar 180, bar 182, wood, drywall, a rack, or any other surface capable of receiving a screw. Screw 190 can have a head portion that is larger than opening 150, so that screw 190 must be removed in order to remove installation card 120 and lighting device 100. Screw 190 can also have a head portion slightly smaller than opening 150, so that card 120 can be easily removed and installed without removing screw 190. Other fasteners such as nails and hooks are also effective in mounting card 120 through opening 150. For example, FIG. 9c shows hook 192 passed through opening 150 to mount installation card 120. Hook 192 allows installation card 120 to swing freely to make room for lighting device 100 when hook 192 is close to a wall, bar, or other surface. Hook 192 and installation card 120 provide increased ease of installation and removal of lighting device 100.

Figure 10:
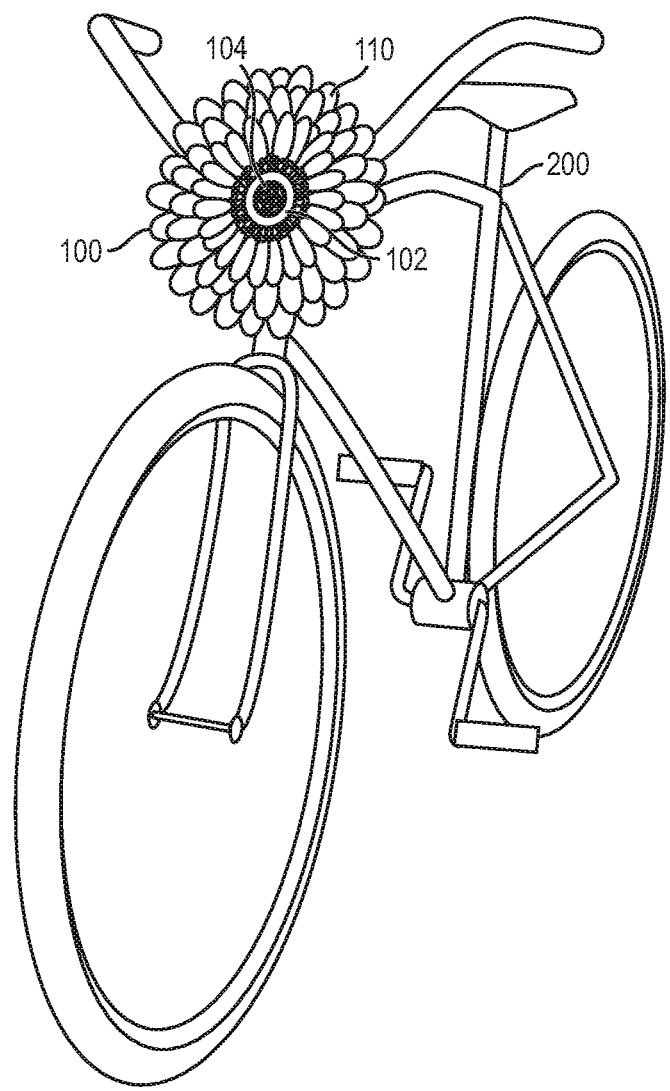
FIG. 10 illustrates a personal lighting device mounted to a bicycle.

FIG. 10 illustrates lighting device 100 mounted to bicycle 200. Light engine 102 and lens 104 face forward relative to bicycle 200 to provide the rider with visibility in the direction of travel and enable other traffic to see the rider. Petals 110 extend radially outward from light engine 102 and forward beyond the level of lens 104. Light engine 102 illuminates petals 110 to increase the visibility of bicycle 200 to drivers, pedestrians, and other bicyclists. Straps 160 are behind lighting device 100 and attach to installation card 120 to affix lighting device 100 to bicycle 200.

Lighting device 100 provides increased safety for bicycle riders and other traffic by increasing illuminated surface area of lighting device 100 to increase visibility of the rider to other drivers and cyclists. Lighting device 100 provides an aesthetically enticing light mechanism to encourage cyclists to use a light. Thus, lighting device 100 increases bicycle safety by increasing light usage by cyclists. Additionally, installation card 120 increases ease of installation and removal of lighting device 100 by providing a fast and simple mechanism to attach lighting device 100 to a bicycle. Multiple openings on installation card 120 enable users to quickly mount lighting device 100 on a variety of bars, racks, walls, or other surfaces to improve ease of installation and removal.

Figure 11A:
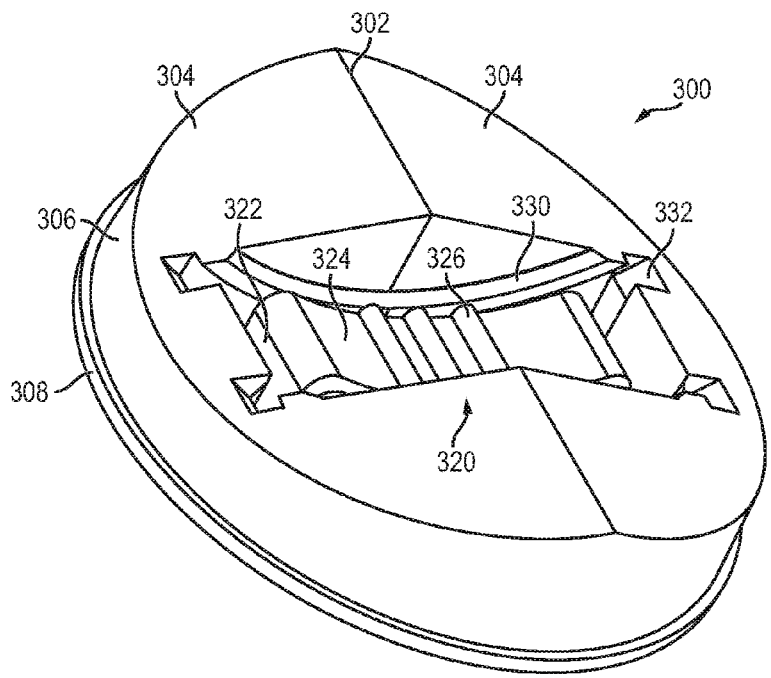
FIGS. 11a-11g illustrate mounting a base to bicycle in a second light device embodiment.

FIGS. 11a-11g illustrate a base 300 for mounting lighting devices similar to personal lighting device 100 to a bicycle handlebar or basket. FIG. 11a illustrates the top side of base 300. Base 300 is configured to be mounted to a handlebar or basket, with a lighting device attached to the base before or after mounting the base. Base 300 is formed from a high durometer silicone, another plastic material, metal, or other appropriate materials. Base 300 is formed by molding, 3D printing, or other suitable manufacturing processes.

A top face of base 300 includes a ridge 302 and two sloped surfaces 304 extending from the ridge. Ridge 302 is centrally located and designed to operate as a fulcrum when adjusting the angle of an attached lighting device. The lighting device pivots on ridge 302 when a force is applied to the lighting device away from the ridge. The light device contacts a face 304 at the furthest extent of the angle adjustment. A side surface 306 of base 300 extends from sloped surfaces 304 at the top of base 300 to a lip 308 at the bottom of the base. Side surface 306 is approximately cylindrical, or approximates a conic section, to correspond to an approximate circle formed by surfaces 304 in plan view. In other embodiments, base 300 is formed in the shape of a square, rectangle, hexagon, or other shape, with surfaces 304 and 306 shaped accordingly. Lip 308 extends outward from side surface 306 around base 300.

Base 300 includes a connector 320 formed near the center of the base for attachment of a lighting device similar to lighting device 100. Connector 320 includes an opening through base 300 with concave plate 324 in the opening coupled to base 300 by flex pieces 322. The shorter ends of concave plate 324 are coupled to the remainder of base 300 by flex pieces 322, while space remains between the longer sides of concave plate 324 and the rest of base 300. Concave plate 324 is formed in the shape of an arc. The arc of concave plate 324 extends approximately perpendicular to ridge 320. As a lighting device is pivoted on ridge 302 to change the angle of the lighting device, an arced convex plate of the lighting device slides along the arc of concave plate 324.

One or more tabs 326 are formed on concave plate 324. Tabs 326 are formed as strips of material on concave plate 324 perpendicular to the arc of concave plate 324 that extend upward from the top surface of concave plate 324. In other embodiments, tabs 326 are small circular or polygonal nubs formed on concave plate 324. Concave plate 324 interfaces with a similarly arc-shaped convex plate of a subsequently attached light device. As the lighting device is pivoted on ridge 302 to change the angle of the lighting device, tabs 326 click into cavities of the convex plate to maintain the lighting device at a desired angle. Tabs 326 are rounded in the dimension along the arc of concave plate 324 to allow the tabs to be pushed out of the cavities by a force along the arc of concave plate 324.

Connector 320 includes arced flanges 330 on internal sidewalls of the connector opening. A flange 330 is formed in the opening of connector 320 on two opposite sides of concave plate 324. Flanges 330 are formed in an arc shape similar to concave plate 324. Flanges 330 are designed to interface with clips of the lighting device that are inserted into connector 320 between flanges 330 and concave plate 324. The arc of flanges 330 allows the clips of the lighting device to stay attached to the flanges of base 300 as the angle of the lighting device is modified. Cut-outs 332 accommodate the clips of the lighting device as the lighting device is rotated farther from center.

Figure 11B:
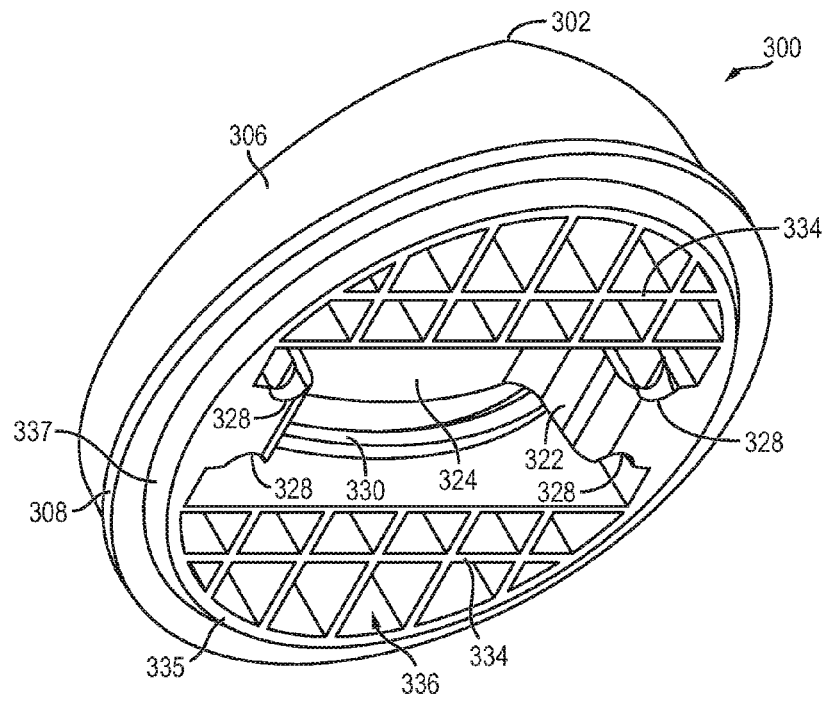

FIG. 11b illustrates the bottom of base 300. Base 300 includes a waffle pattern 334 forming a plurality of cavities 336. Waffle pattern 334 is a portion of the base 300 material formed into a plurality of perpendicular stripes under sloped surfaces 304. A bottom ring 335 encloses waffle pattern 334 at the edges of base 300. Bottom surfaces of waffle pattern 334, bottom ring 335, and flex pieces 322 are approximately coplanar and form the bottom surface of base 300. A ridge 337 connects bottom ring 335 to lip 308. Waffle pattern 334 strengthens base 300 while keeping the weight of the base low and reducing material usage. Other configurations for the pattern 334 are used in other embodiments. In some embodiments, base 300 is a solid piece and does not include cavities 336.

Figure 11C:
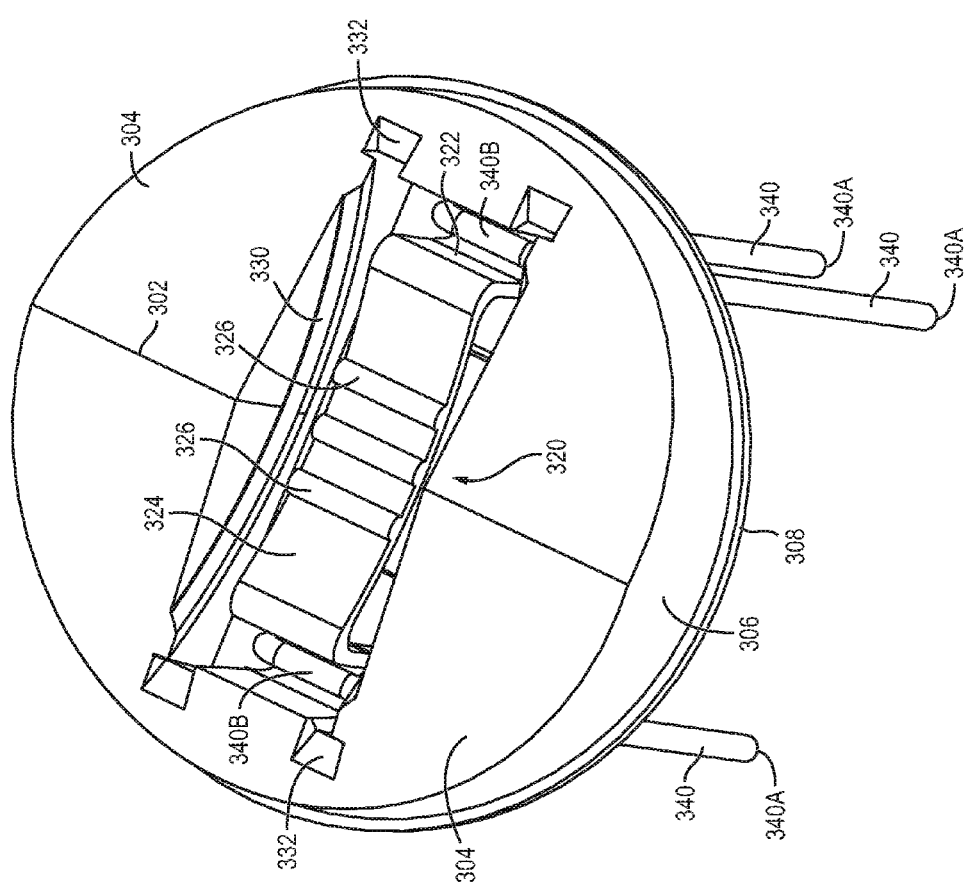

Flex pieces 322 include indentations 328 at the bottom of the flex pieces, near the contact point to sidewall 306 and bottom ring 335. Indentations 328 accommodate twist-ties, zip-ties, or another attachment mechanism by providing additional space between flex pieces 322 and the body of base 300. FIG. 11c illustrates twist-ties 340 disposed on base 300 and through indentations 328 at the bottom of flex pieces 322. The ends 340A of twist-ties 340 are inserted through the opening of connector 320. Each twist-tie 340 has one end 340A on each side of concave plate 324. A central portion 340B of each twist-tie 340 rests on the bottom of flex-piece 322 with tie 340 in indentations 328. Indentations 328 help position twist-ties 340 at the bottom of flex pieces 322 and allow thicker twist-ties 340 to be used. Twist-ties 340 are used to attach base 300 onto a basket, handlebar, post, or other substrate where the usage of a lighting device is desired. Twist-ties 340 are a long and thin metal cylinder coated in a plastic or rubber material. Other types of ties are used in other embodiments, e.g., zip ties or twist-ties with a paper coating.

Figure 11D:
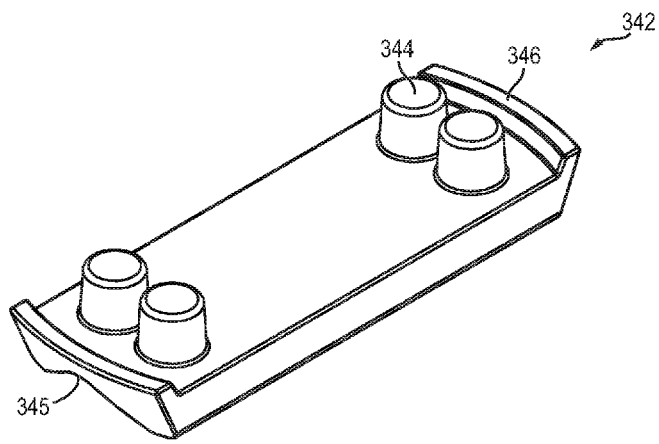

FIG. 11d illustrates base support 342. Base support 342 includes nubs 344 configured to align with cavities 336 on the bottom of base 300. In one embodiment, nubs 344 are sized to create an interference fit with waffle pattern 334. The nubs are pressed into cavities 336 to hold base support 342 onto the bottom of base 300 prior to installation of the base onto a handlebar or basket. Lip 346 of base support 342 extends over ridge 337 of base 300, and contacts lip 308 in one embodiment. Base support 342 is positioned between base 300 and a bicycle handlebar or basket to dampen vibrations from the bicycle being transferred to a lighting device mounted on base 300. Base support 342 is formed from a soft plastic or rubbery material to improve vibration dampening. In one embodiment, base support 342 is formed from silicone with a hardness of 50-60 on the shore type-A durometer scale.

A notch or groove 345 extends along the length of base support 342. Groove 345 is designed to increase contact area with a handlebar of a bicycle, thus increasing friction between base 300 and the handlebar. Base 300 with base support 342 is placed on a handlebar with the handlebar in groove 345 and base 300 facing the desired direction or angle for light to be emitted. Twist-ties 340 are tightened around the handlebar. Grip between base support 342 and the handlebar keeps a lighting device aimed forward relative to a bicycle, rather than slipping down to point at the ground.

Figure 11E:
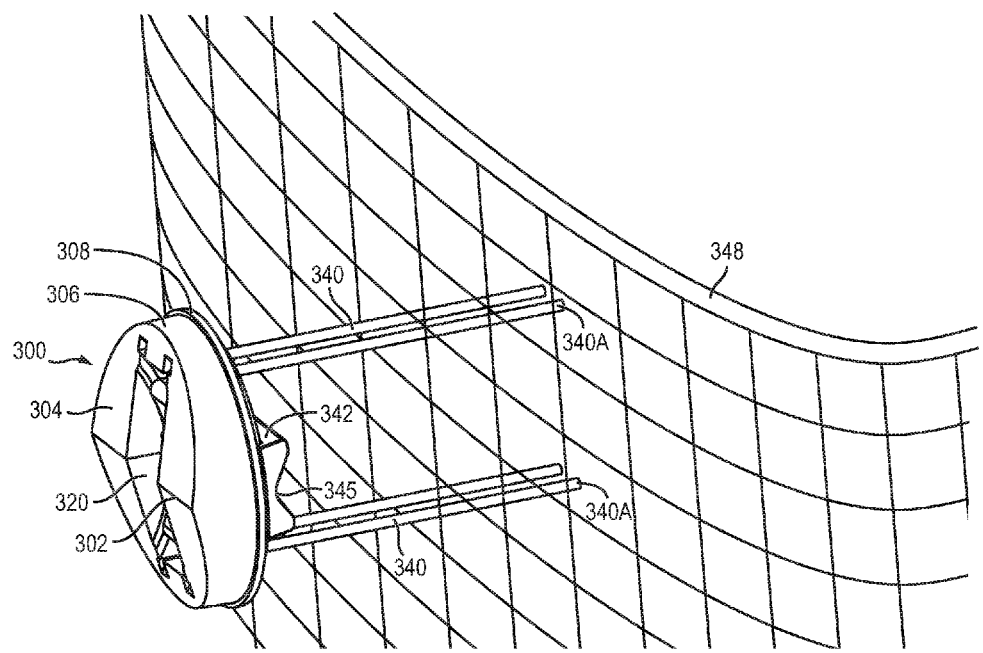

FIG. 11e illustrates base 300 being installed on a bicycle basket 348. Bicycle basket 348 includes a plurality of holes through the basket in between the weave pattern of the basket. Different basket embodiments are possible, i.e., differing weave patterns or differing construction materials, but base 300 is designed to be attached to substantially all baskets. In some embodiments, twist-ties 340 may need to be punched through the basket material to install base 300.

Figure 11F:
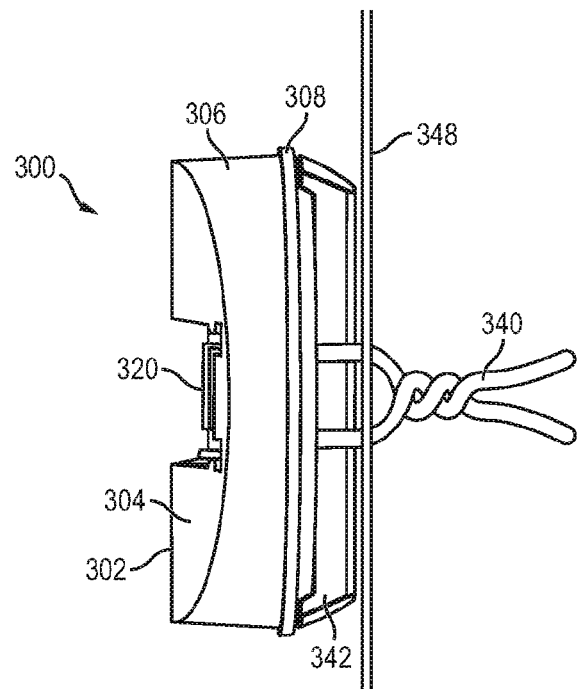
Figure 11G:
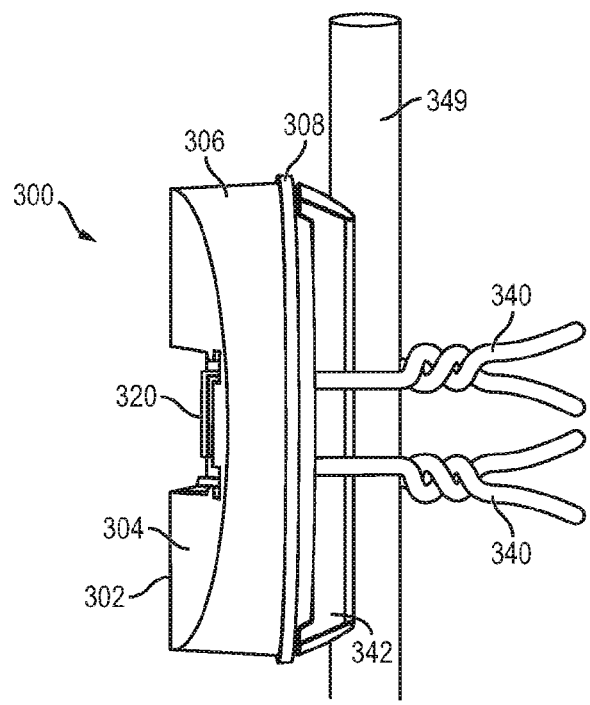

The four ends 340A of twist-ties 340 are threaded through the openings of basket 348 and pulled through until base support 342 is contacting the basket. Then, as illustrated in FIG. 11f, twist-ties 340 are twisted together to attach the base to the basket. Twist-ties 340 may be twisted with each end 340A twisted around the opposite end of the same twist-tie, or each twist-tie end may be twisted with an end of the other twist-tie 340. FIG. 11f illustrates base 300 installed on a basket 348 with the two ends 340A of a common twist-tie 340 twisted together. In FIG. 11g, base 300 is installed on a handlebar 349 with the ends 340A of twist-ties 340 twisted with ends of the opposite twist-tie 340. Handlebar 349 is in groove 345 to increase grip of base 300 against the handlebar.

Figure 12A:
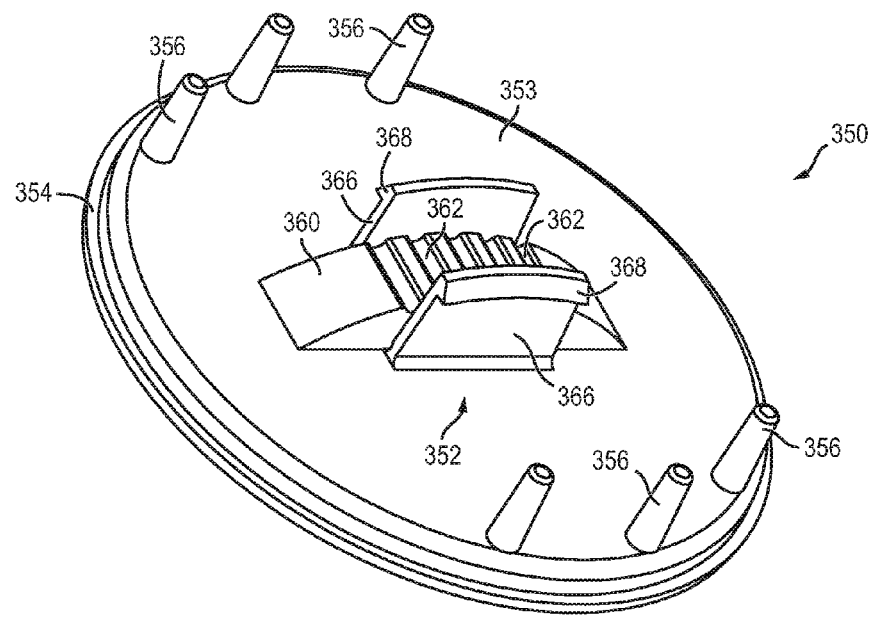
FIGS. 12a-12b illustrate a battery housing for the second light device embodiment.

With base 300 installed on a bicycle handlebar or basket, a lighting device with an attachment mechanism corresponding to connector 320 can be installed on the bicycle by attaching the lighting device to the base. FIG. 12a illustrates the bottom side of a battery housing 350 including a connector 352 that is designed to mate with connector 320 of base 300. A lighting device for attachment to base 300 is formed around battery housing 350 as taught below. Battery housing 350 includes a flat portion 353. The bottom of flat portion 353 presses against ridge 302 to pivot battery housing 350 on base 300. Flat portion 353 presses against sloped surfaces 304 of base 300 when battery housing 350 rotates sufficiently. A lip 354 extends around flat portion 353. In one embodiment, battery housing 350 is formed from polypropylene or another similar plastic that is molded or 3D-printed.

Heat spikes 356 are disposed on flat portion 353 around connector 352. Heat spikes 356 are used during manufacturing of the lighting device. Portions of the lighting device include openings that are disposed around heat spikes 356, and then the ends of the heat spikes are melted or otherwise deformed to hold the lighting device together.

Connector 352 includes a convex plate 360. Convex plate 360 includes a similar arc shape as concave plate 324 from base 300. Cavities, indentations, or notches 362 are formed in convex plate 360. Notches 362 are configured to correspond to tabs 326 on concave plate 324 of base 300. Notches 362 are shaped as stripes across convex plate 360 because tabs 326 are similar stripes. Tabs 326 fit at least partially within notches 362 when connector 352 is interfaced with connector 320. Connector 352 includes clips 366 extending vertically from flat portion 353 at the sides of convex plate 360. Clips 366 include hooked portions 368 that extend horizontally outward from the clips, i.e., away from convex plate 360.

Battery housing 350 is attached to base 300 by interfacing connector 352 with connector 320. Clips 366 are lined up at the sides of concave plate 324 and slip into the spaces between concave plate 324 and flanges 330. As clips 366 are inserted around concave plate 324, sloped top surfaces of hooked portions 368 press against sloped top surfaces of flanges 330. Hooks 368 pressing against flanges 330 apply a force against clips 366 that bends the clips inward toward convex plate 360, allowing the clip hooks to travel past flanges 330. Once hooks 368 are fully past flanges 330, the hooks expand out to latch onto flanges 330. Flat bottom surfaces of hooks 368 press against flat bottom surfaces of flanges 330 to hold battery housing 350 onto base 300.

The attachment between clips 366 and flanges 330 holds convex plate 360 against concave plate 324, and holds tabs 326 at least partially in notches 362. Friction between notches 362 and tabs 362 reduces the likelihood that battery housing 350 will rotate relative to base 300 without sufficient force being applied by a user of the lighting device. A user applies a force to battery housing 350 to rotate the curvature of convex plate 360 along the curvature of concave plate 324. The force displaces tabs 326 out of notches 362. Concave plate 324 moves away from convex plate 360 with the displacement of tabs 326 because flex plates 322 allows movement of concave plate 324. Flex pieces 322 maintain a slight force of tabs 326 against convex plate 360, so that as battery housing 350 rotates, tabs 326 will be pressed into the next adjacent notches 362 encountered by the force of flex pieces 322. Hooks 368 of clips 366 include an arc shape similar to the arc of concave plate 324, flanges 330, and convex plate 360, so that hooks 368 maintain good contact with flanges 330 at a wide range of angles between battery housing 350 and base 300.

Figure 12B:
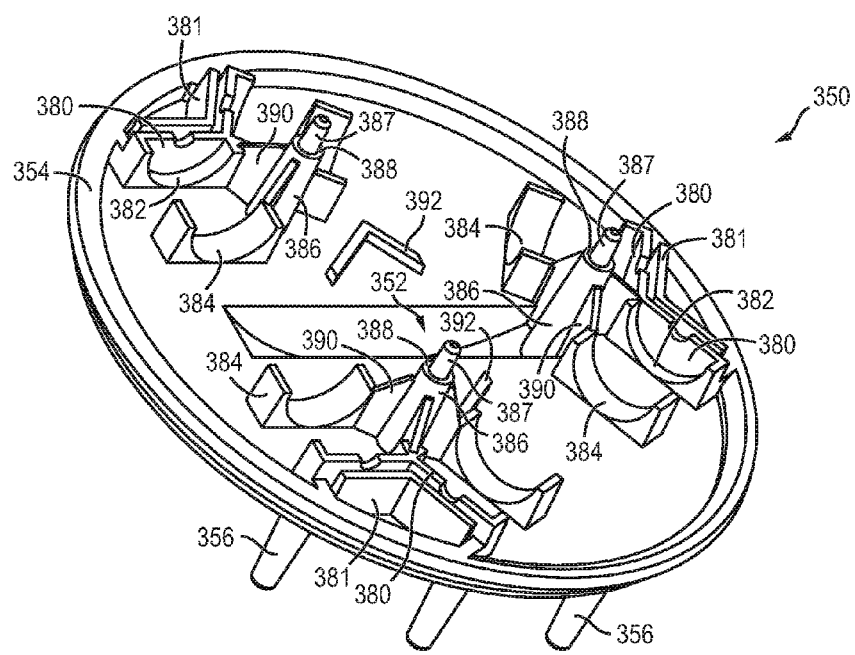

FIG. 12b illustrates the top side of battery housing 350. Battery housing 350 includes battery holders 380. Battery holders 380 have a curved bottom surface 382 configured to receive a cylindrical battery, such as AA or AAA type batteries. Battery housing 350 includes three battery holders 380 that each hold an end of two different batteries. Battery holders 380 are oriented in a triangle so that three batteries can be disposed in the battery holders and connected in series by electrical contacts. Backing 381 holds the electrical contacts in place over battery holder 380 by pressure applied by the contact between the backing and battery holder. In other embodiments, other orientations of battery holders 380 are used as needed for a design, i.e., different battery types or number of batteries are usable by changing the orientation of the battery holders. Curved battery guides 384 are disposed between battery holders 380 to guide the batteries into the holders during installation.

Battery housing 350 has a plurality of posts 386 extending vertically from flat portion 353. Posts 386 hold a reflector for guiding light emitted by the lighting device. The reflector is inserted over thinner portions 387 and rests on horizontal support portions 388. While three posts 386 are illustrated, other numbers of posts are used in other embodiments. Supports 390 strengthen posts 386 by providing a wider footprint for contact between flat portion 353 and posts 386. LED guides 392 form an outline to hold an LED light module disposed on battery housing 350. LED guides 392 are oriented in a square to hold a light engine in place that has a square bottom, but LED guides 392 are configured as needed to accommodate any light engine used with a particular embodiment. While the term "battery housing" is used, some embodiments do not in fact use battery housing 350 to house batteries. However, the term battery housing 350 refers to a part having a connector 352 for mounting to base 300, and having structural features for forming a lighting device around the battery housing, even if the battery housing does not directly physically support a battery.

Figure 13B:
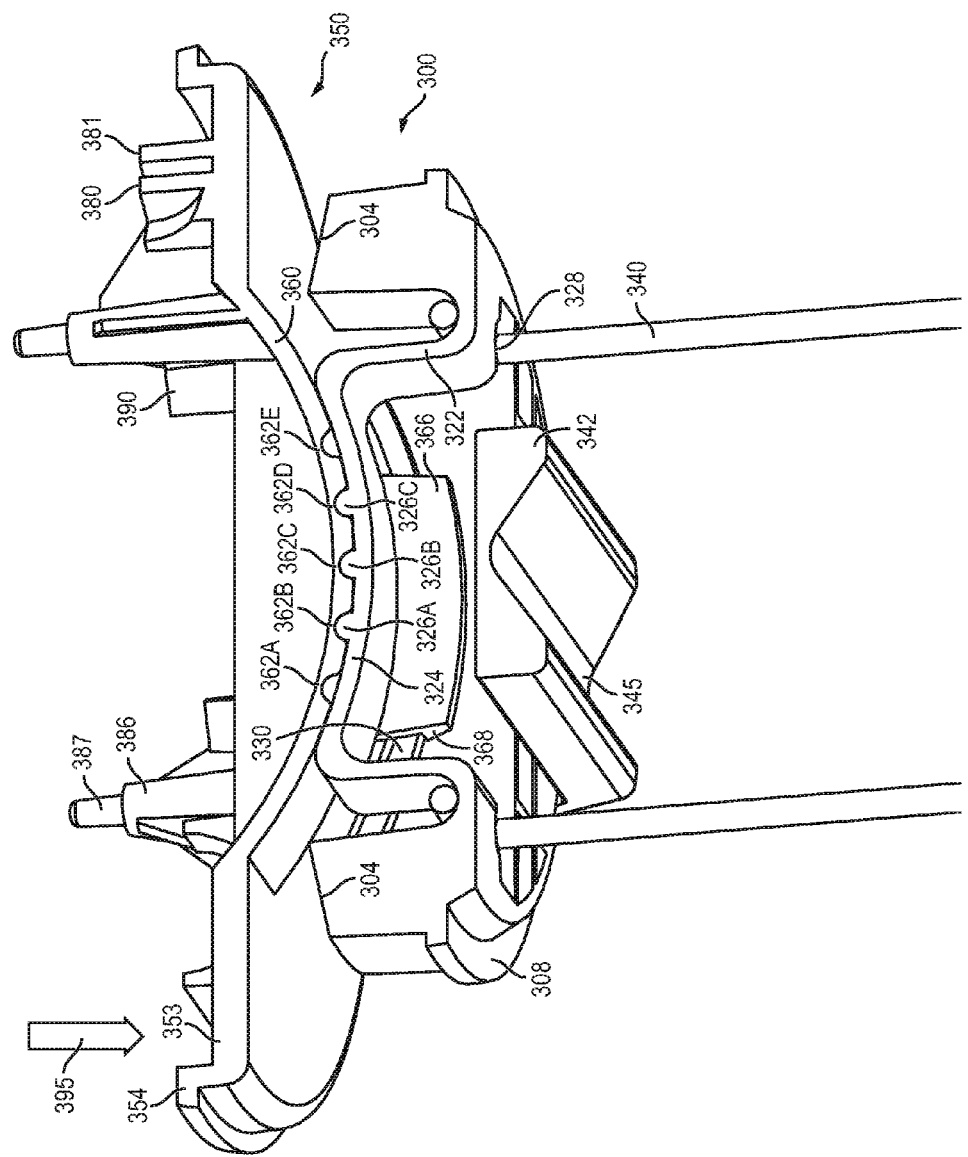
Figure 13C:
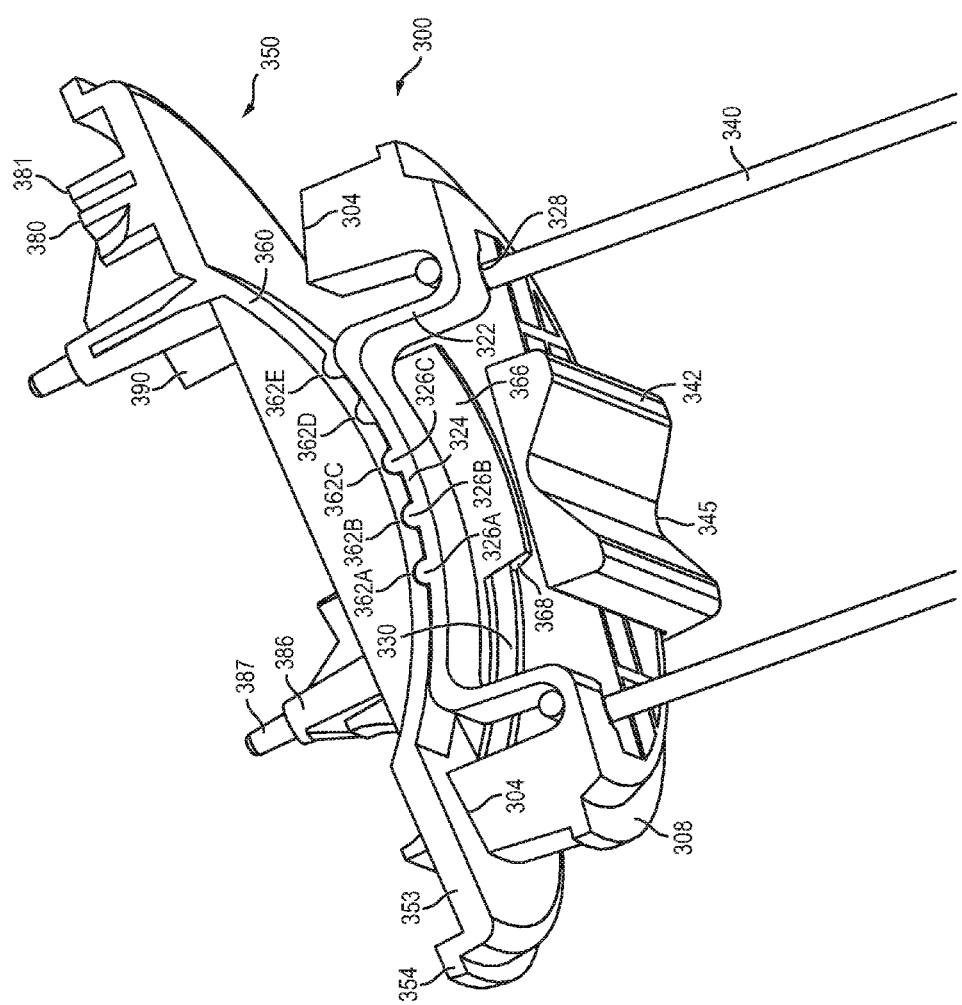

FIGS. 13a-13c illustrate battery housing 350 installed on base 300. Clips 366 are engaged with flanges 330 to hold battery housing 350 on base 300. In FIG. 13a, battery housing 350 is aimed straight, i.e., flat portion 353 is approximately parallel to the bottom of base 300. Light emitted by the lighting device is aimed substantially perpendicular to a surface that base 300 is mounted on. To adjust the angle of battery housing 350 relative to base 300, and thus the angle of light emitted, a force 395 is applied to battery housing 350. A center area of flat portion 353 presses against ridge 302 as a fulcrum. Flat portion 353 operates similar to a lever and the downward force 395 rotates battery housing 350. The rotational force moves convex plate 360 along concave plate 324, and tabs 326 rotate into adjacent notches 362. When battery housing 350 rotates sufficiently, flat portion 353 presses against a sloped surface 304.

FIG. 13b illustrates a cross-section through the arc of concave plate 324 and convex plate 360 from a similar angle as FIG. 13a. Convex plate 360 is pressed against concave plate 324 with tabs 326 in the central three notches 362B, 362C, and 362D. The rotational force resulting from force 395 pressing flat portion 353 against ridge 302 applies a force on convex plate 360 to the right in the illustrated view. The surfaces of notches 362 press downward on tabs 326, and concave plate 324 is pressed away from convex plate 360. Flex pieces 322 allow concave plate 324 to be pressed away from convex plate 360. As force 395 starts to rotate battery housing 350, enough separation is eventually created between concave plate 324 and convex plate 360 to fit tabs 326.

Battery housing 350 continues to rotate from force 395 until tabs 326 are in the adjacent notches 362 as shown in FIG. 13c. In FIG. 13c, battery housing is fully rotated so that the first tab 326A is in the first notch 362A. Notches 362 and tabs 326 keep battery housing 350 in the position of FIG. 13c until another force is applied to battery housing 350. A force similar to force 395 applied on the opposite side of battery housing 350 will rotate the battery housing back to center and then continue rotating so that eventually tab 326C is in notch 362E. As battery housing 350 rotates relative to base 300, the arc of hook 368 follows the arc of flange 330 to keep the battery housing securely attached to base 300 via clip 366.

Three tabs 326 and five notches 362 are provided, which allows for three different positions of battery housing 350 relative to base 300. In other embodiments, more or less angular positions are provided by increasing the number of notches 362 or decreasing the number of tabs 326. For instance, using one tab 326 would allow five different positions because the one tab 326 could be in any of the five notches 362. In some embodiments, notches 362 are provided more densely positioned on convex plate 360 to allow a tighter degree of control on the angle of light emitted.

Tabs 326 and notches 362 are each clicking elements. As tabs 326 are pushed into different notches 362, the tabs click into the notches. In some embodiments, notches are formed on concave plate 324 and tabs are formed on convex plate 360. With the location of the tabs and notches switched, the tabs still click into the notches to securely hold battery housing 350 at a desired angle while still allowing the angle to be changed. In other embodiments, different clicking elements besides tabs and notches are provided to latch in battery housing 350 at a desired angle relative to base 300.

Figure 14A:
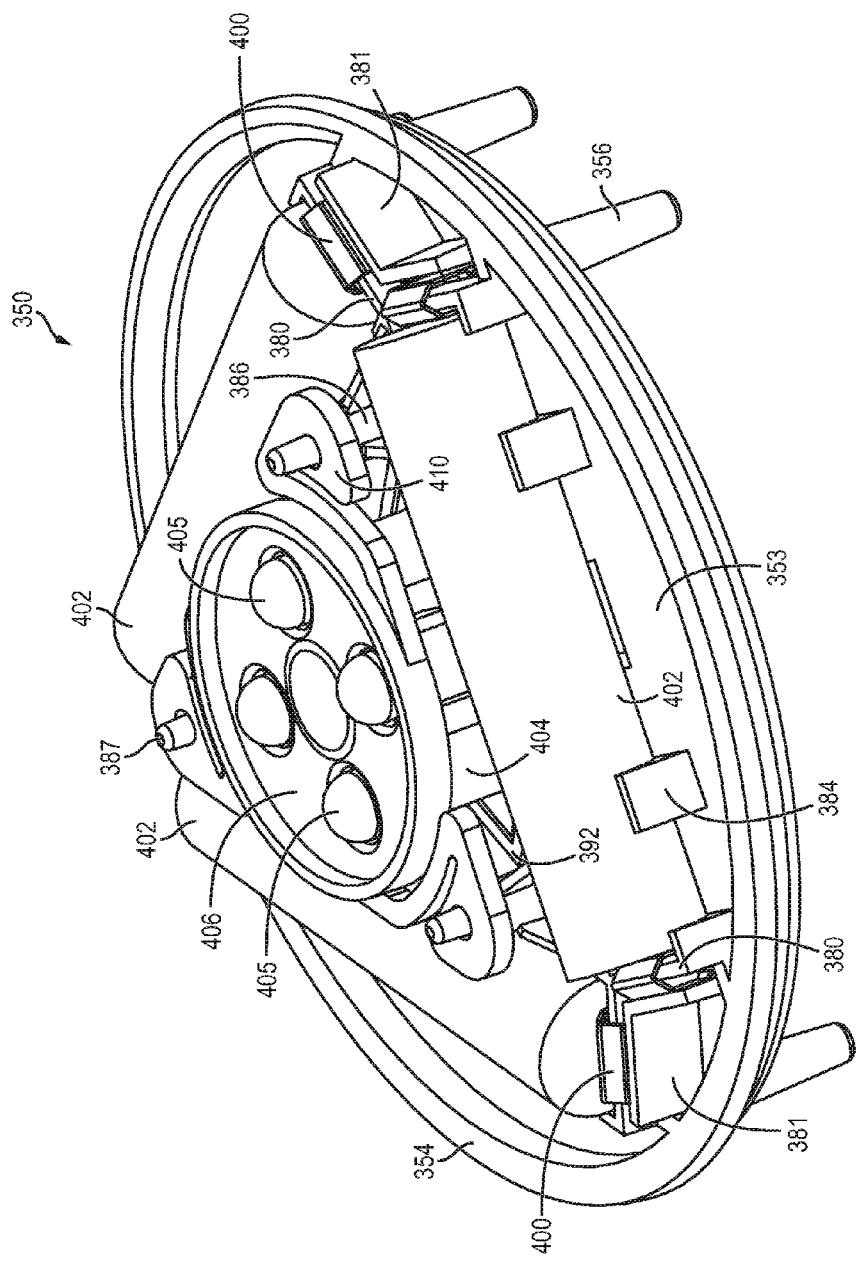
FIGS. 14a-14h illustrate making the second light device embodiment based on the battery housing.

FIGS. 14a-14h illustrate putting together a lighting device around battery housing 350 prior to attaching the battery housing to base 300. FIG. 14a shows the top of battery housing 350. Battery contacts 400 are disposed on battery holders 380. Battery contacts 400 are formed from 0.01 inch thick spring steel in one embodiment. Battery contacts 400 are shaped to be fit between battery holders 380 and backings 381 and held in place by pressure from a battery contact pressing against a battery holder and a backing. Batteries 402 are disposed over battery holders 380 and battery guides 384. Battery contacts 400 apply a spring force on batteries 402 to hold the batteries in place on battery housing 350. Each battery contact 400 contacts terminals of two adjacent batteries. Two of the contacts 400 connect the adjacent battery terminals together, while the third contact 400 is separated and wired to LED light engine 404. Thus, the three batteries 402 are connected in series between terminals of light engine 404 by contacts 400.

Light engine 404 includes a square base that is set within LED guides 392 for alignment. Light engine 404 includes one or more LEDs 405 that emit the light in the final lighting product. In some embodiments, light engine 404 includes a printed circuit board (PCB) with conductive traces and circuit components for routing and conditioning electricity from batteries 402. The PCB may form the square base of light engine 404. Light engine 404 is similar to light engine 102 in some embodiments.

Reflector 406 is disposed over light engine 404 and around LEDs 405. Reflector 406 is formed from polypropylene with a chrome finish to reflect light. In other embodiments, reflector 406 is formed from a solid metal material and may operate as a heatsink for light engine 404. Reflector 406 includes openings that LEDs 405 go into. The openings of reflector 406 support LEDs 405 against lateral movement in addition to reflecting light from the LEDs in the desired direction. Reflector 406 includes arms 410 that hold the reflector in position on posts 386. Thin portions 387 of posts 386 are inserted through openings of arms 410, and arms 410 rest on horizontal support portions 388. Arms 410 around thin portions 387 of posts 386 keep reflector 406 aligned without applying significant pressure against LEDs 405.

Figure 14B:
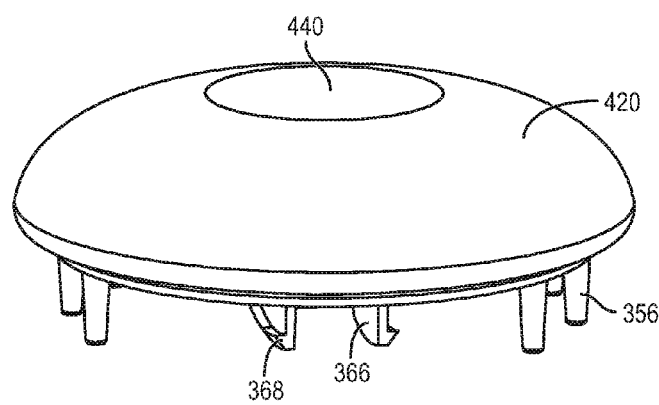

In FIG. 14b, a top housing 420 and lens 440 are disposed over and around battery housing 350. Top housing 420 is formed from silicone with a hardness of 50-60 on the shore type-A durometer scale in one embodiment. In some embodiments, top housing 420 is semi-transparent to allow light from LEDs 405 to shine through and light up the top housing. The material of top housing 420 stretches slightly to extend around battery housing 350 and be held in place by lip 354. Together, top housing 420 and battery housing 350 envelop the internal components of the lighting device. Battery housing 350 is a bottom housing relative to top housing 420. Top housing 420 is stretched to allow lens 440 to be installed in an opening at the center of the top housing. In one embodiment, lens 440 is formed from a clear acrylic. Any material is used in other embodiments to condition light emitted by LEDs 405 as desired.

Figure 14C:
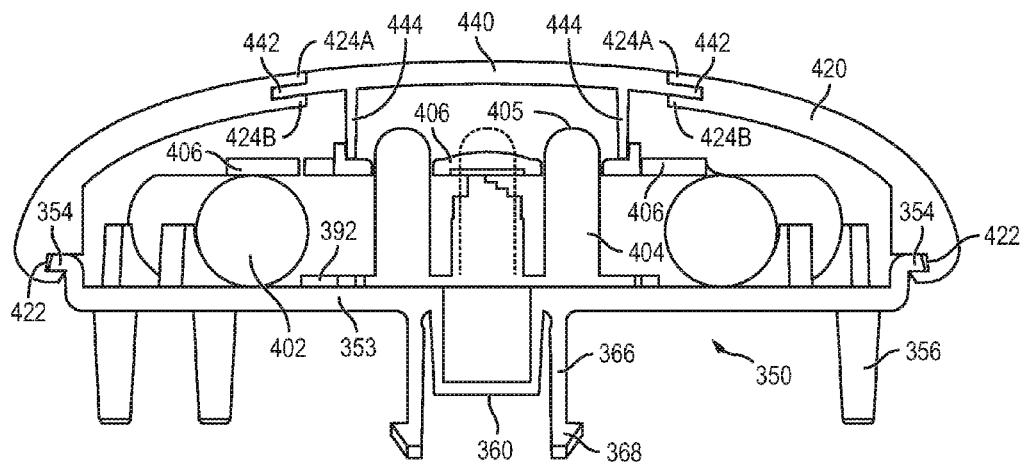

FIG. 14c illustrates a cross-sectional view of top housing 420 and lens 440 installed on battery housing 350. Top housing 420 includes an internal trench or slit 422 that fits around lip 354 of battery housing 350. Top housing 420 is stretched slightly during installation on battery housing 350 to insert lip 354 into slit 422. Slit 422 holds top housing 420 in place on battery housing 350 by encompassing lip 354. Top housing 420 is circular and slit 422 runs the circumference of the top housing to fully encompass lip 354 around the circumference of battery housing 350. Top housing 420 is stretched again to remove the top housing and give a user access to the parts disposed on battery housing 350, e.g., to replace batteries 402 or light engine 404.

Top housing 420 includes a slit 424, similar to slit 422, for holding lens 440 in place. Lens 440 is approximately circular and includes a lip 442 around the circumference of the lens that is inserted into slit 424. Top housing 420 is deformed and stretched to allow lip 442 to be inserted into slit 424, and then the top housing returns to its original shape to hold lip 442 between portions 424A and 424B of slit 424. Lens 440 includes support 444 extending down to reflector 406. Support 444 helps keep lens 440 and top housing 420 in position over battery housing 350. Support 444 helps maintain the shape of top housing 420 when downward pressure is received. Force on the top of the lighting device is transferred through lens 440 by support 444 to reflector 406 and pillars 386 to reduce deformation of top housing 350.

Figure 14D:
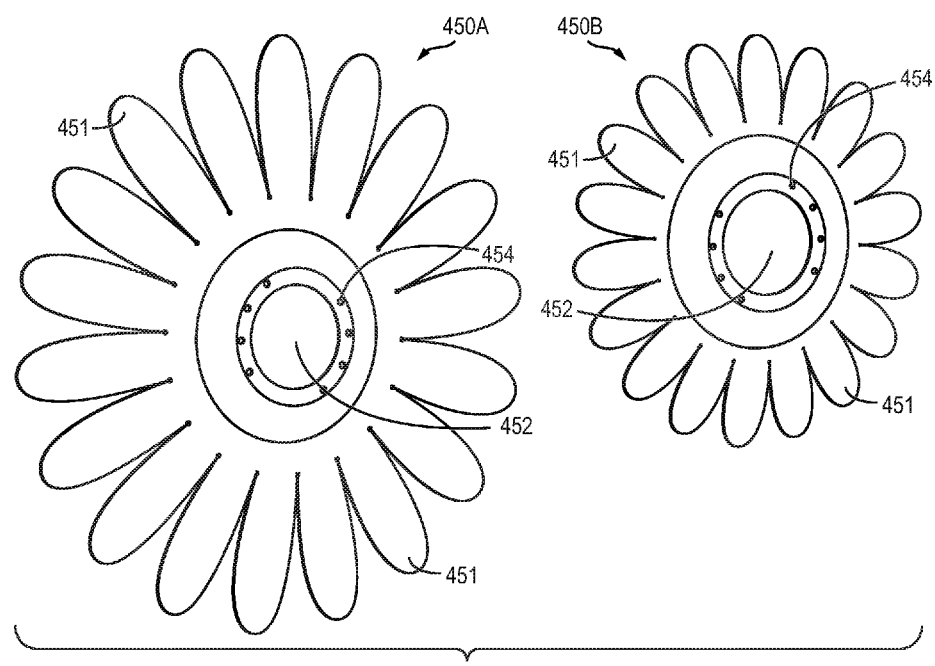

FIG. 14d illustrates flower trim 450 which will be installed on the bottom of battery housing 350, over heat stakes 356 and around connector 352. In one embodiment, flower trim 450 is formed from a sheet of ethylene vinyl acetate (EVA) that is cut or punched into a desired shape. In other embodiments, trim 450 is formed similar to petals 110. Two different sizes of flower trim 450 are illustrated, a large trim 450A and a small trim 450B. In other embodiments, only a single trim 450 is used, or more than two sizes of trim are used together. Trim 450 includes a plurality of flower petals 451 formed around the periphery of the trim. Petals 451 create the appearance of a flower for the lighting device, but other trim shapes are used in other embodiments, e.g., points oriented outward like a sunflower or a basic shape such as a circle.

A central opening 452 of trim 450 fits around connector 352, allowing the connector to be exposed when the trim is installed. Holes 454 are formed around opening 452. Holes 454 are positioned to be aligned with heat stakes 356. Four holes 454 are provided on two opposite sides of opening 452 to allow trim 450 to be placed in two different rotational positions on the three heat stakes 356 per side. When multiple trim 450 pieces are used, having additional holes 454 allows the trim pieces to be rotated relative to each other. In one embodiment, two large trim pieces 450A are used, with each having a different set of holes 454 being placed on heat stakes 356. The rotation between the two large trim pieces 450A allows the petals 451 of the back trim piece to be visible between the petals of the front trim piece. In some embodiments, additional holes 454 are formed to allow additional rotational flexibility for positioning the trim. Holes 454 may be placed closer together to allow a higher resolution of positioning for trim 450.

Figure 14E:
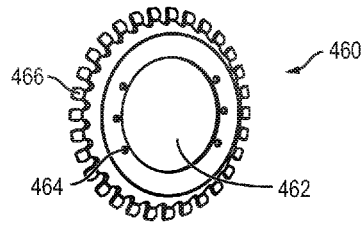

FIG. 14e illustrates petal organizer 460 which will be placed on the bottom of battery housing 350 over trim 450 as a back plate to hold the trim in place. Petal organizer 460 includes an opening 462, similar to opening 452 of trim 450, that leaves connector 352 exposed when the petal organizer is installed on battery housing 350. Holes 464 are formed around opening 462, similar to holes 454. Holes 464 allow petal organizer 460 to be installed on battery housing 450 with heat stakes 356 extending through holes 454 and 464. Petal organizer 460 includes fingers 466 that press the petals 451 of trim 450 forward. Fingers 466 pressing petals 451 forward in front of LEDs 405 increases the amount of light from light engine 404 that hits the trim, and increase visibility of the lighting device. In one embodiment, petal organizer 460 is formed from molded or 3D-printed polypropylene.

Figure 14F:
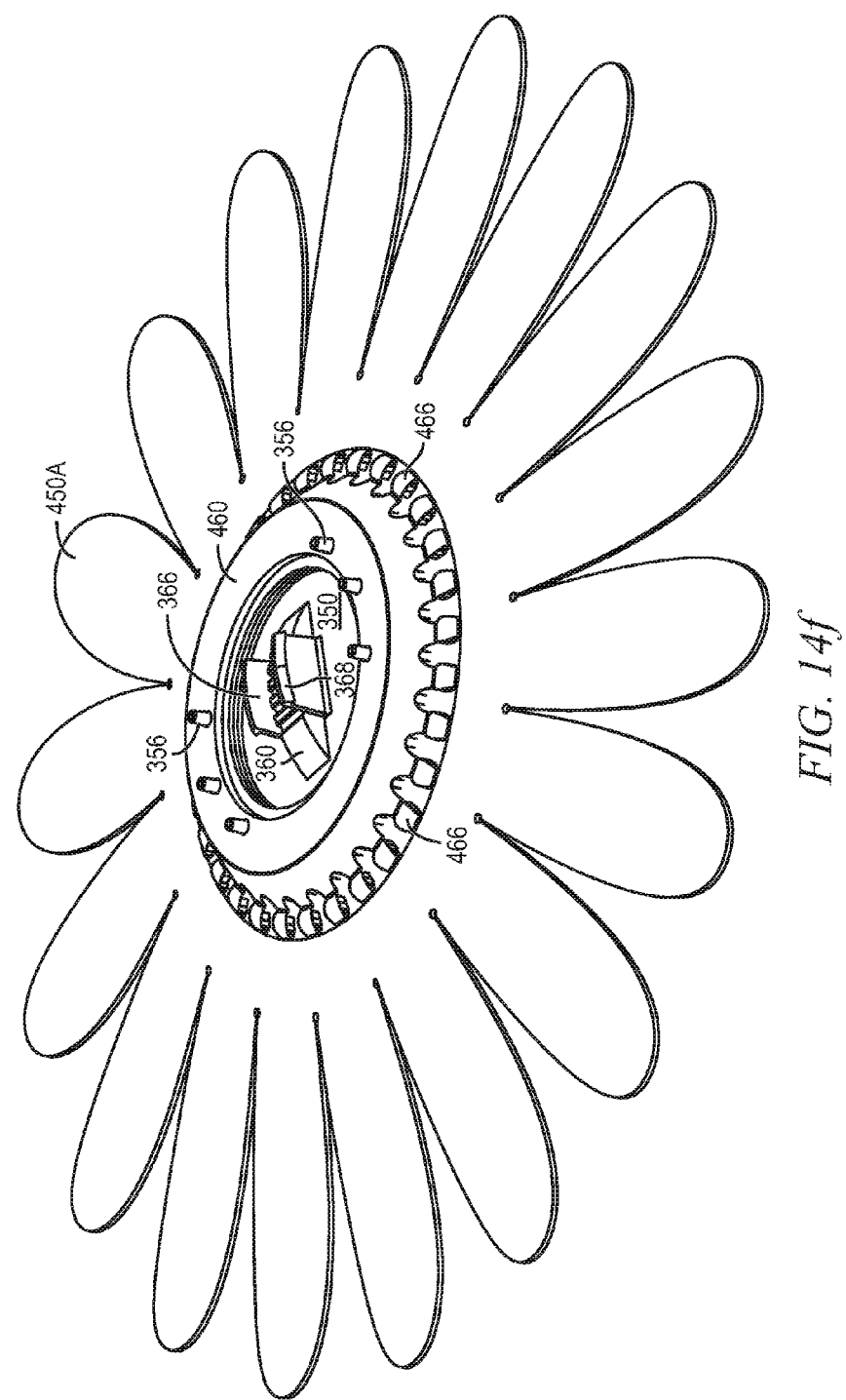

Petal organizer 460 is installed onto battery housing 350 after trim 450, as illustrated in FIG. 14f. One or more pieces of trim 450 are sandwiched in between battery housing 350 and petal organizer 460. Heat stakes 356 extend through openings 454 of trim 450 and openings 464 of petal organizer 460. Fingers 466 of petal organizer 460 press petals 451 forward, away from the viewer in the orientation of FIG. 14f.

Figure 14G:
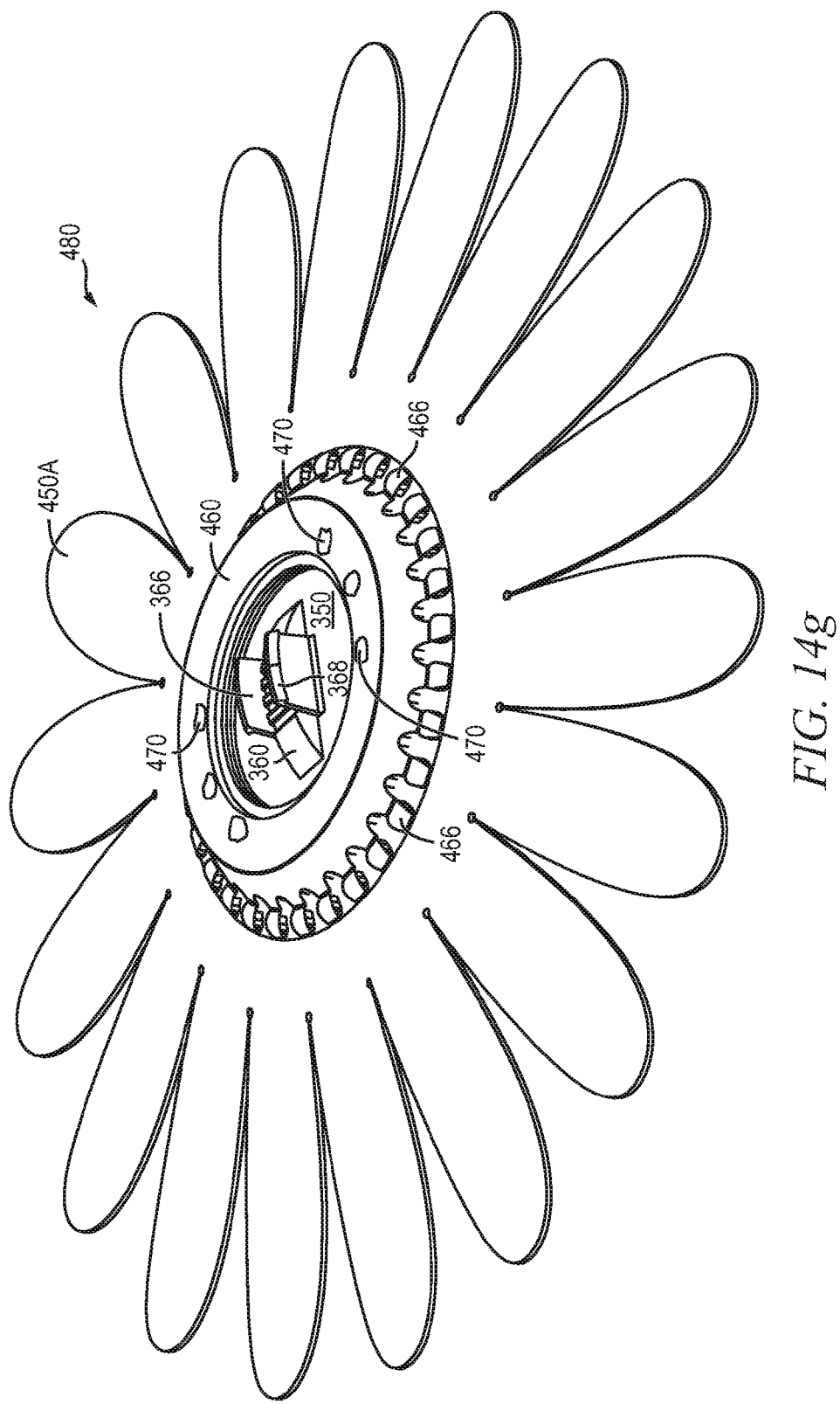

In FIG. 14g, heat stakes 356 are melted to create a permanent or semi-permanent attachment of petal organizer 460 to battery housing 350. Heat stakes 356 have a slip fit with holes 454 and 464 prior to being melted. Heat is applied to melt heat stakes 356 after the heat stakes are inserted through holes 454 and 464. The melting of heat stakes 356 creates heads 470 on the heat stakes that are wider than holes 464. In some embodiments, heat stakes 356 are not melted, but merely softened by heating and deformed by pressure to create heads 470. Heads 470 have an interference fit between the heat stakes and petal organizer 356 which holds the petal organizer onto battery housing 350, with trim 450 sandwiched therebetween. In some embodiments, heat stakes 386 are welded to the back surface of petal organizer 460.

Melting of heat stakes 456 to create heads 470 finishes lighting device 480, which is now ready to be installed on base 300. In some embodiments, trim 350 and petal organizer 360 are installed on the back side of battery housing 350 prior to the installation of the components on the front side of the battery housing, e.g., batteries 402, light engine 404, and top housing 420.

Figure 14H:
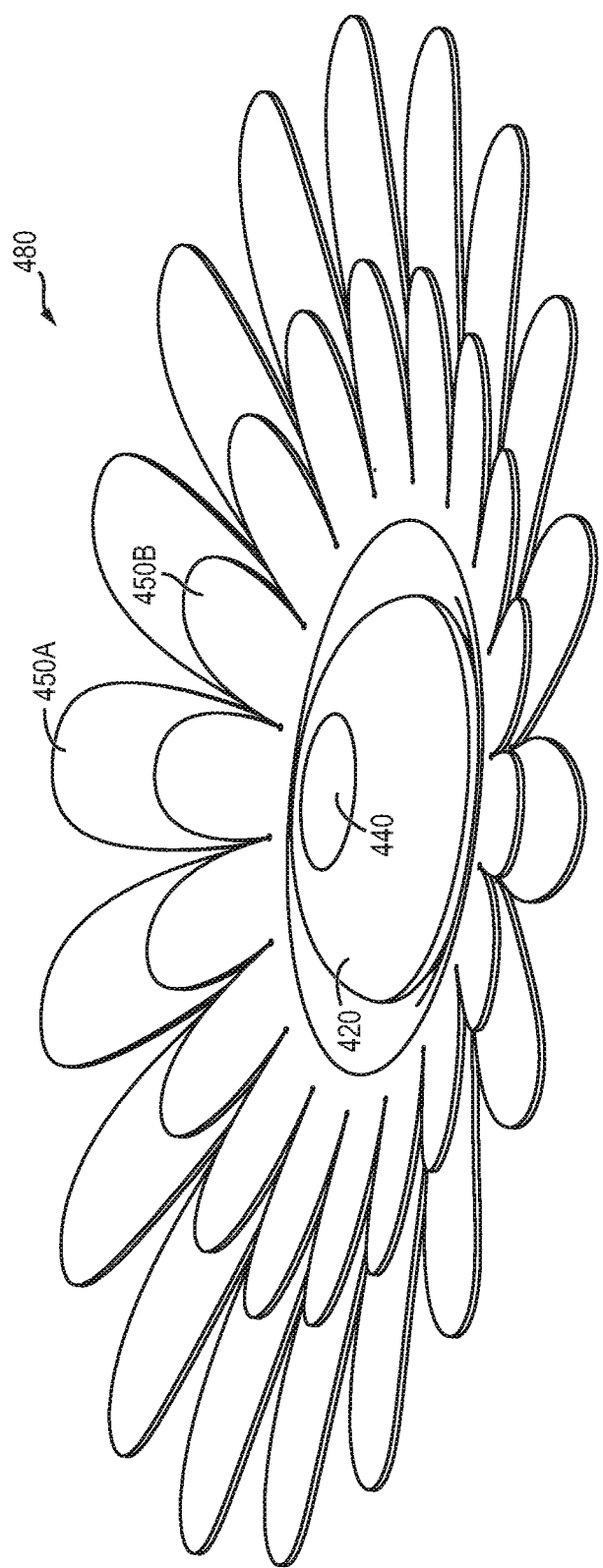
Figure 15:
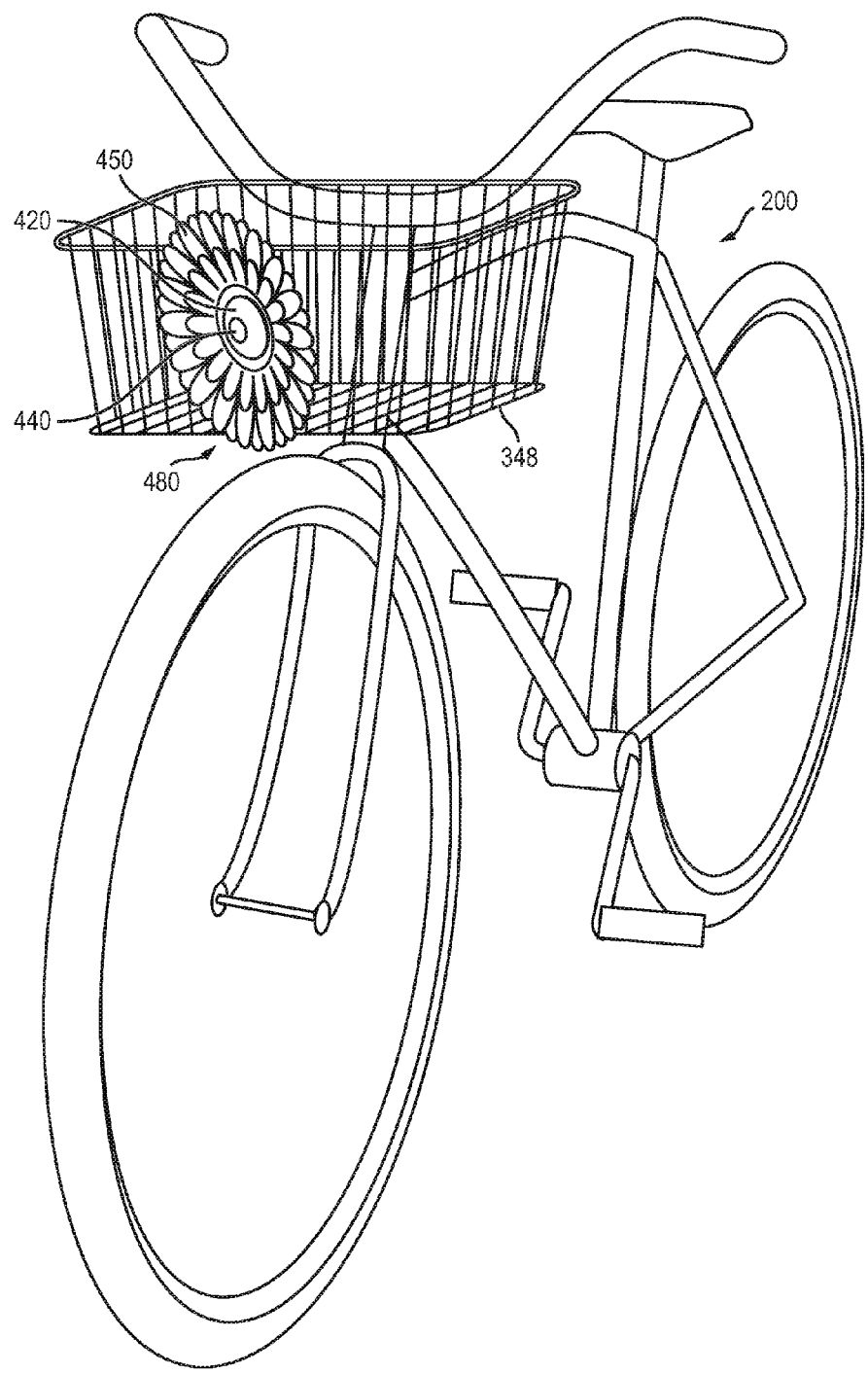
FIG. 15 illustrates the second light device embodiment installed on a bicycle.

FIG. 14h illustrates the completed lighting device 480 from the front, opposite the view of FIGS. 14f-14g. Lighting device 480 is installed on bicycle 200 by orienting connector 352 toward connector 320 of base 300 and pressing hooks 368 onto flanges 330. In other embodiments, lighting device 480 is attached to base 300 prior to installing the base onto basket 348. FIG. 15 illustrates lighting device 480 installed on bicycle 200 via basket 348.

LED light engine 404 emits light through lens 440, and also illuminates top housing 420 and trim 450. Lighting up top housing 420 and trim 450 creates a broader and more easily visible light source for bicycle 200. Trim 450 is pressed forward by petal organizer 460 to increase the amount of light that reflects off of the trim. Lighting device 480 can be angled relative to base 300 on basket 348 by pressing on the top or bottom of the lighting device. Angling lighting device 480 is used to compensate for the angle of basket 348 relative to the ground while riding bicycle 200, because different baskets and different handlebars have front sides at different angles. Lighting device 480 increases safety and can be easily and flexibly installed on any bicycle basket or handlebar.

While lighting device 480 is illustrated in use adding visibility to a bicycle, lighting device 480 is mountable onto other vehicles, or static objects, using base 300. Lighting device 480 adds significantly to visibility, making any desired object easier to detect visually. The mounting system of base 300 and ties 340 is flexible in the ways it can be used because ties 340 can attach base 300 to any bicycle handlebar or basket, or any other substrate that ties 340 are able to extend through or reach around. Longer ties 340 are able to be used to mount base 300 onto larger objects. Moreover, the system is flexible because concave plate 324 and convex plate 360 allow adjustment of the angle of light relative to base 300.

While one or more embodiments of the present invention have been illustrated in detail, the skilled artisan will appreciate that modifications and adaptations to those embodiments may be made without departing from the scope of the present invention as set forth in the following claims.

What is claimed:

1. A light device, comprising:
   a base;
   a first housing attached to the base;
   a light-emitting diode (LED) disposed on the first housing;
   a second housing disposed over the first housing with the LED between the first housing and second housing; and
   a trim disposed on the first housing or second housing, wherein the trim includes a plurality of petals.

2. The light device of claim 1, wherein the first housing includes a heat spike disposed through the trim.

3. The light device of claim 1, wherein the second housing includes a lens.

4. The light device of claim 1, wherein the base includes a first portion of an attachment mechanism and the first housing includes a second portion of the attachment mechanism.

5. The light device of claim 4, wherein the attachment mechanism allows adjustment of an angle of the first housing relative to the base.

6. A light device, comprising:
   a base including a first portion of an attachment mechanism;
   a first housing including a second portion of the attachment mechanism, wherein the first housing is attached to the base by the attachment mechanism;
   a light-emitting diode (LED) disposed on the first housing; and
   a first trim disposed on the first housing.

7. The light device of claim 6, wherein the first trim includes a first plurality of petals.

8. The light device of claim 7, further including a second trim disposed on the first housing, wherein the second trim includes a second plurality of petals.

9. The light device of claim 8, wherein the first housing includes a heat spike disposed through the first trim and second trim.

10. The light device of claim 6, further including a second housing disposed over the first housing and LED.

11. The light device of claim 6, wherein the attachment mechanism extends through an opening in the first trim.

12. A method of making a light device, comprising:
    providing a base;
    attaching a first housing to the base;
    disposing a light-emitting diode (LED) on the first housing; and
    disposing a first trim on the first housing opposite the LED, wherein the first trim includes a first plurality of petals.

13. The method of claim 12, further including disposing a second trim over the first housing opposite the LED, wherein the second trim includes a second plurality of petals.

14. The method of claim 13, wherein the first housing includes a heat spike disposed through the first trim and second trim.

15. The method of claim 12, further including disposing a second housing over the first housing and LED.

16. The method of claim 15, further including providing the second housing to include a lens.

17. The light device of claim 1, wherein the trim is disposed on the first housing opposite the second housing, and the trim extends in front of the second housing to allow illumination of the trim by the LED.

18. The light device of claim 6, wherein the first trim extends outward and forward from a point of attachment of the first trim to the first housing.

19. The light device of claim 6, wherein the attachment mechanism allows the housing and trim to pivot or rotate relative to the base.

20. The light device of claim 6, wherein the first trim is disposed on the first housing opposite the LED and the first trim extends in front of the LED.

* * * * *